US012165579B2

(12) United States Patent
Chung et al.

(10) Patent No.: US 12,165,579 B2
(45) Date of Patent: Dec. 10, 2024

(54) DRIVING CIRCUIT AND DISPLAY DEVICE USING THE SAME

(71) Applicant: LG Display Co., Ltd., Seoul (KR)

(72) Inventors: Moonsoo Chung, Paju-si (KR); Wookyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/485,048

(22) Filed: Oct. 11, 2023

(65) Prior Publication Data

US 2024/0038155 A1 Feb. 1, 2024

Related U.S. Application Data

(63) Continuation of application No. 18/072,118, filed on Nov. 30, 2022, now Pat. No. 11,823,619, which is a continuation of application No. 17/472,399, filed on Sep. 10, 2021, now Pat. No. 11,545,083.

(30) Foreign Application Priority Data

Sep. 25, 2020 (KR) ........................ 10-2020-0124809

(51) Int. Cl.
*G09G 3/3208* (2016.01)

(52) U.S. Cl.
CPC ....... *G09G 3/3208* (2013.01); *G09G 2310/08* (2013.01); *G09G 2320/0233* (2013.01); *G09G 2320/0252* (2013.01)

(58) Field of Classification Search
CPC .. G09G 3/3208; G09G 3/3225; G09G 3/3233; G09G 3/3258; G09G 2300/0819; G09G 2300/0842; G09G 2300/0861; G09G 2310/0251; G09G 2310/08; G09G 2320/0233; G09G 2320/0252; G09G 2320/0626; G09G 2340/0435
See application file for complete search history.

(56) References Cited

U.S. PATENT DOCUMENTS 7,088,051 B1 * 8/2006 Cok ..................... G09G 3/3233 345/76
10,049,617 B2 8/2018 Shin et al.
10,810,930 B2 10/2020 Shim et al.
11,823,619 B2 * 11/2023 Chung ................. G09G 3/3208
11,869,446 B2 1/2024 Park et al.
2013/0201124 A1 8/2013 Choi et al.
2015/0062100 A1 3/2015 Tanaka et al.
(Continued)

FOREIGN PATENT DOCUMENTS

CN 106468970 A 3/2017
CN 108028032 A 5/2018
(Continued)

OTHER PUBLICATIONS

United States Office Action, U.S. Appl. No. 17/472,399, Apr. 27, 2022, 10 pages.
(Continued)

*Primary Examiner* — Stacy Khoo
(74) *Attorney, Agent, or Firm* — Fenwick & West LLP

(57) ABSTRACT

An electroluminescent display device using a variable refresh rate (VRR) mode. The occurrence of a difference in luminance at a time point of a refresh rate change is reduced, thereby preventing viewers from perceiving the change of the refresh rate.

22 Claims, 26 Drawing Sheets

(56) References Cited

U.S. PATENT DOCUMENTS

| | | | | |
|---|---|---|---|---|
| 2017/0053592 | A1 | 2/2017 | Shin et al. | |
| 2017/0092210 | A1 | 3/2017 | Tann et al. | |
| 2018/0151109 | A1 | 5/2018 | Shim et al. | |
| 2021/0327344 | A1* | 10/2021 | Dong .................. | G09G 3/3233 |
| 2021/0327368 | A1 | 10/2021 | Park et al. | |

FOREIGN PATENT DOCUMENTS

| | | | |
|---|---|---|---|
| CN | 108109583 | A | 6/2018 |
| KR | 10-2018-0059017 | A | 6/2018 |
| KR | 10-2020-0080787 | A | 7/2020 |
| WO | WO 2020/060008 | A1 | 3/2020 |

OTHER PUBLICATIONS

United States Office Action, U.S. Appl. No. 18/072,118, Mar. 30, 2023, 10 pages.

China National Intellectual Property Administration, Office Action, Chinese Patent Application No. 202111093385.7, Jan. 5, 2024, 12 pages.

Korean Intellectual Property Office, Office Action, Korean Patent Application No. 10-2020-0124809, Feb. 21, 2024, 12 pages.

* cited by examiner (a) refresh rate: 60Hz (b) refresh rate: 1Hz

DRIVING CIRCUIT AND DISPLAY DEVICE USING THE SAME

This application is a continuation of U.S. patent application Ser. No. 18/072,118 filed Nov. 30, 2022, which is a continuation of U.S. patent application Ser. No. 17/472,399 filed on Sep. 10, 2021 which claims the benefit of Korean Patent Application No. 10-2020-0124809 filed on Sep. 25, 2020, each of which are incorporated by reference in its entirety.

BACKGROUND

Field

The present disclosure relates to an electroluminescent display device using a variable refresh rate (VRR) mode, and is designed to reduce the occurrence of a difference in luminance at a time point of a refresh rate change at which a data voltage is updated.

Description of the Related Art

An electroluminescent display device which uses an electroluminescent device such as an organic light emitting diode may be driven by various driving frequencies.

Recently, as one of various functions required for the display device, a variable refresh rate (VRR) is also required. The VRR is a technology that drives a display device at a constant frequency and activates pixels by increasing the refresh rate when high-speed driving is required, and drives pixels by reducing the refresh rate when it is necessary to reduce power consumption or low-speed driving is required.

When the refresh rate at which the data voltage is updated according to the VRR changes, the change of the refresh rate may be perceived unnaturally by viewers. Accordingly, it is required to prevent the viewers from perceiving the change of the refresh rate.

SUMMARY

Technical Problem

The present disclosure relates to an electroluminescent display device using a variable refresh rate (VRR) mode, and the purpose of the present disclosure is to reduce the occurrence of a difference in luminance at a time point of a refresh rate change, thereby preventing viewers from perceiving the change of the refresh rate.

The present disclosure provides a means for solving the above-mentioned problems and has the following embodiments.

Technical Solution

One embodiment is a display device including: a flag unit which outputs a flag value for distinguishing refresh rates; a counter which counts a refresh frame and a hold frame in accordance with the flag value and accumulates a count value; a first register unit which includes a plurality of registers, the plurality of registers storing adjusted bias voltage values, respectively; a second register unit which includes a plurality of registers, the plurality of registers storing a light emission signal value for generating a light emission control signal, respectively; and a comparator which outputs a comparison value such that the first register unit selects the adjusted bias voltage value in accordance with the flag value and the count value and selects the light emission signal value. The display device is driven to adjust the pulse width of the light emission signal or the bias voltage in accordance with the comparison value.

Another embodiment is a display driver. A refresh rate is changed in units of a frame in accordance with an image. The frame is distinguished into a refresh frame for writing a data voltage and a hold frame for maintaining the data voltage written in the refresh frame. The frame is counted in units of the refresh frame and the hold frame in accordance with the refresh rate and the counted values are accumulated. A bias voltage is adjusted and applied before and after a time point of the switching of the refresh rate. A pulse width of a light emission signal is adjusted before and after a time point of the switching of the refresh rate in accordance with the counted value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
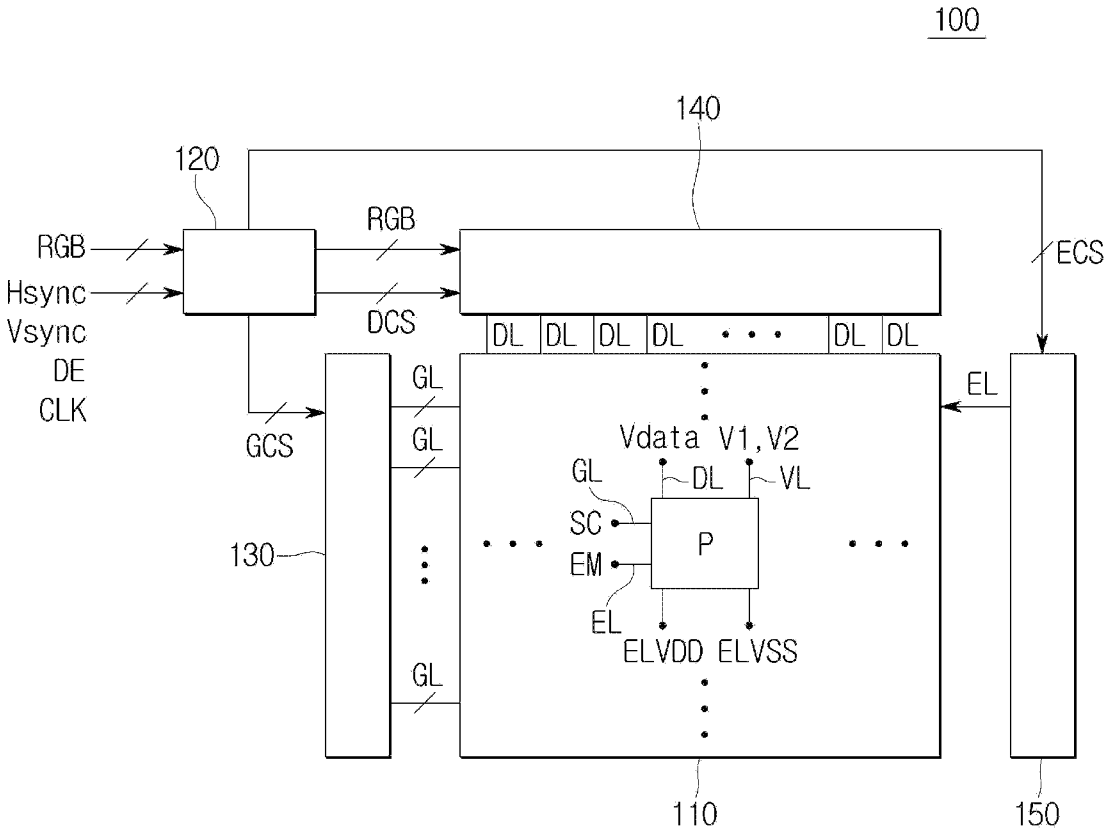
FIG. 1 is a block diagram showing schematically an electroluminescent display device according to an embodiment of the present invention.

The features, advantages and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are only provided to make those skilled in the art fully understand the scope of the present invention. The present invention is just defined by the scope of the appended claims. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, etc., can be used to describe various components, the components are not limited by the terms mentioned above. The terms are used only for distinguishing between one component and other components.

Therefore, the first component to be described below may be the second component within the spirit of the present invention. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

The term "module" or "part" used in this specification may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

FIG. 1 is a block diagram showing schematically an electroluminescent display device according to an embodiment of the present invention.

Referring to FIG. 1, the electroluminescent display device 100 includes a display panel 110 including a plurality of pixels, a gate driver 130 supplying a gate signal to each of the plurality of pixels, and a data driver 140 supplying a data signal to each of the plurality of pixels, and an active control signal generator 150 supplying a light emission signal to each of the plurality of pixels and a timing controller 120.

The timing controller 120 processes an image data RGB input from the outside appropriately for the size and resolution of the display panel 110 and provides it to the data driver 140. The timing controller 120 generates a plurality of gate control signals GCS, a plurality of data control signals DCS, and a plurality of light emission control signals ECS by using synchronization signals SYNC input from the outside, for example, a dot clock signal CLK, a data-enable signal DE, a horizontal synchronization signal Hsync, and a vertical synchronization signal Vsync. By providing the plurality of generated gate, data, and light emission control signals GCS, DCS, and ECS to the gate driver 130, the data driver 140, and the light emission signal generator 150, respectively, the timing controller 120 controls the gate driver 130, the data driver 140, and the light emission signal generator 150.

The timing controller 120 may be coupled to various processors, for example, a microprocessor, a mobile processor, an application processor, etc., according to a mounted device.

The timing controller 120 generates a signal such that the pixel can be driven at various refresh rates. That is, the timing controller 120 generates signals related to driving such that the pixels are driven in a variable refresh rate VRR mode or driven to be switchable between a first refresh rate and a second refresh rate. For example, the timing controller 120 simply changes the speed of a clock signal, generates a synchronization signal to generate a horizontal blank or a vertical blank, or drives the gate driver 130 in a mask method, thereby driving the pixel at various refresh rates.

Also, the timing controller 120 generates various signals for driving a pixel driving circuit at the first refresh rate. Particularly, when the pixel driving circuit is driven at the first refresh rate, the timing controller 120 generates the light emission control signal ECS in order that the light emission signal generator 150 generates a light emission signal EM having a first duty ratio. Then, the timing controller 120 operates to drive the pixel driving circuit at the second refresh rate, and, to this end, generates various signals for driving at the second refresh rate. In particular, when the pixel driving circuit is driven at the second refresh rate, the light emission signal generator 150 generates the light emission control signal ECS in order that the light emission signal generator 150 generates the light emission signal EM having a second duty ratio different from the first duty ratio.

The gate driver 130 provides scan signals SC to gate lines GL in accordance with the gate control signal GCS provided from the timing controller 120. In FIG. 1, the gate driver 130 is shown to be arranged apart from one side of the display panel 110. However, the number and arrangement position of the gate driver 130 are not limited thereto. That is, the gate driver 130 may be disposed on one side or both sides of the display panel 110 in a Gate In Panel (GIP) method.

The data driver 140 converts the image data RGB into a data voltage Vdata in accordance with the data control signal DCS provided from the timing controller 120, and supplies the converted data voltage Vdata to the pixel through a data line DL.

In the display panel 110, a plurality of gate lines GL, a plurality of light emission lines EL, and a plurality of data lines DL cross each other, and each of the plurality of pixels is connected to the gate line GL, the light emission line EL, and the data line DL. Specifically, one pixel receives the gate signal from the gate driver 130 through the gate line GL, receives the data signal from the data driver 140 through the data line DL, and receives the light emission signal EM through the light emission line EL, and receives various power through a power supply line. Here, the gate line GL provides the scan signal SC, the light emission lines EL provides the light emission signal EM, and the data line DL supplies the data voltage Vdata. However, according to various embodiments, the gate line GL may include a plurality of scan signal lines, and the data line DL may further include a plurality of power supply lines VL. Also, the light emission line EL may also include a plurality of light emission signal lines. Also, one pixel receives a high potential voltage ELVDD and a low potential voltage ELVSS. Also, one pixel may receive a first and a second bias voltage V1 and V2 through the plurality of power supply lines VL.

Further, each of the pixels includes an electroluminescent device and a pixel driving circuit that controls the driving of the electroluminescent device. Here, the electroluminescent device includes an anode, a cathode, and an organic light emitting layer between the anode and the cathode. The pixel driving circuit includes a plurality of switching elements, driving switching elements, and capacitors. Here, the switching element may be comprised of a TFT. In the pixel driving circuit, a driving TFT controls the amount of current supplied to the electroluminescent device in accordance with a difference between a reference voltage and the data voltage charged in the capacitor, and controls the amount of light emission of the electroluminescent device. Also, a plurality of switching TFTs receive the scan signal SC supplied through the gate line GL and the light emission signal EM supplied through the light emission line EL, and charge the data voltage Vdata in the capacitor.

The electroluminescent display device 100 according to the embodiment of the present invention includes the gate driver 130, the data driver 140, and the light emission signal generator 150, which are for driving the display panel 110 including the plurality of pixels, and the timing controller 120 for controlling them. Here, the light emission signal generator 150 is configured to be able to control the duty ratio of the light emission signal EM. For example, the light emission signal generator 150 may include a shift register, a latch, etc., for controlling the duty ratio of the light emission signal EM. The light emission signal generator 150 may be configured to generate the light emission signal having the first duty ratio and to provide it to the pixel driving circuit, when the pixel driving circuit is driven at the first refresh rate in accordance with the light emission control signal ECS generated by the timing controller 120, and may be configured to generate the light emission signal having the second duty ratio different from the first duty ratio and to provide it to the pixel driving circuit, when the pixel driving circuit is driven at the second refresh rate.

Figure 2A:
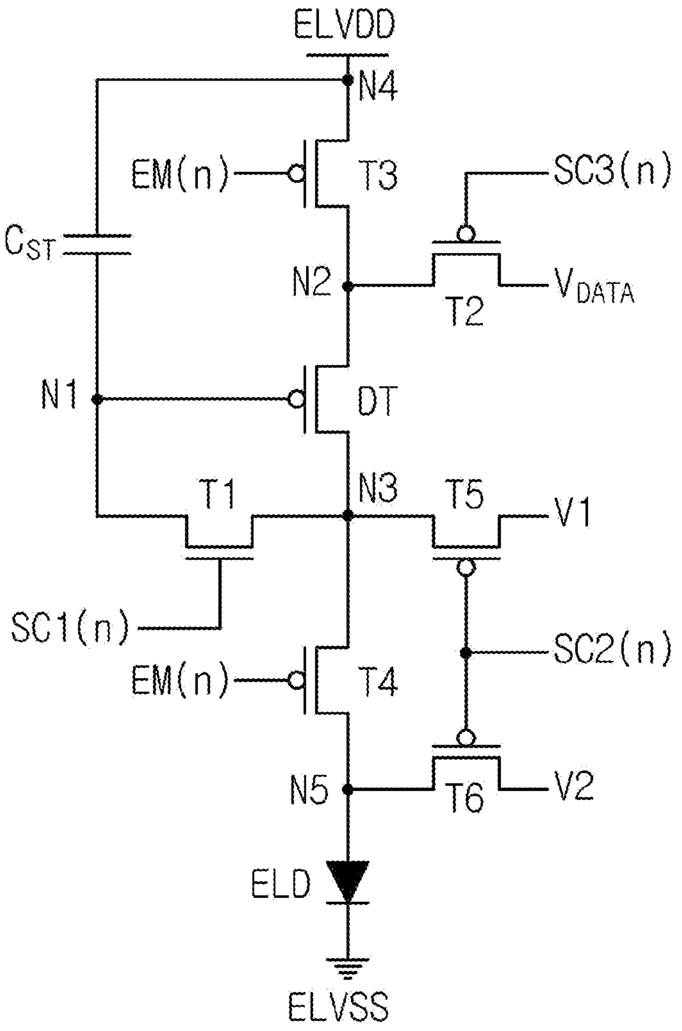
FIGS. 2A, 2B, and 2C are exemplary circuit diagrams of a pixel circuit of the electroluminescent display device according to the embodiment of the present invention.
Figure 2B:
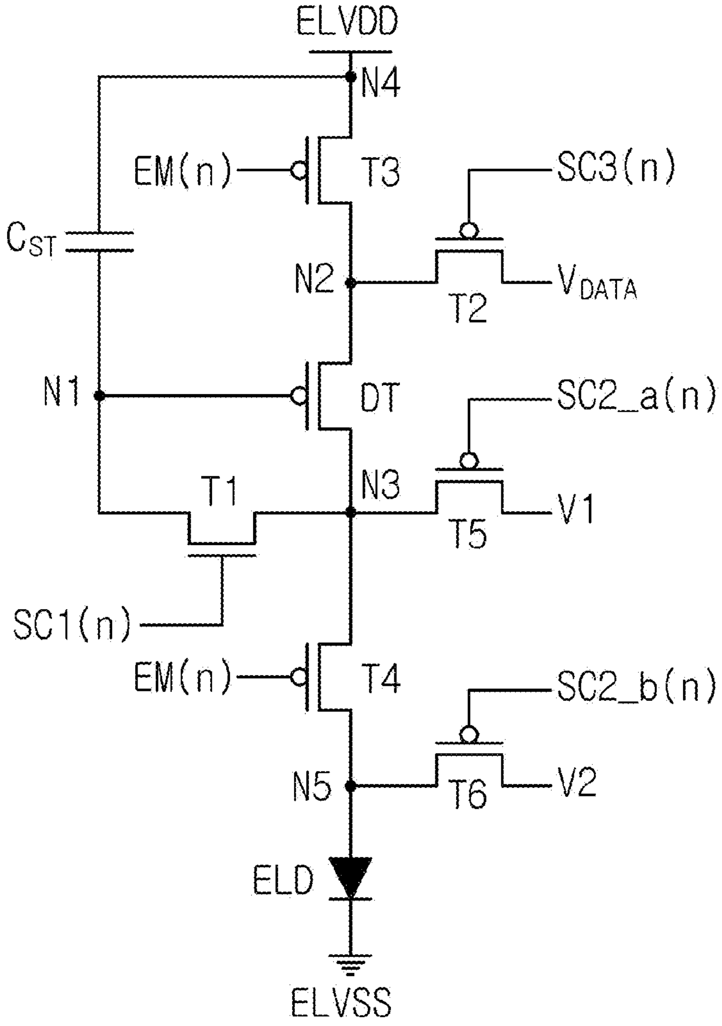
Figure 2C:
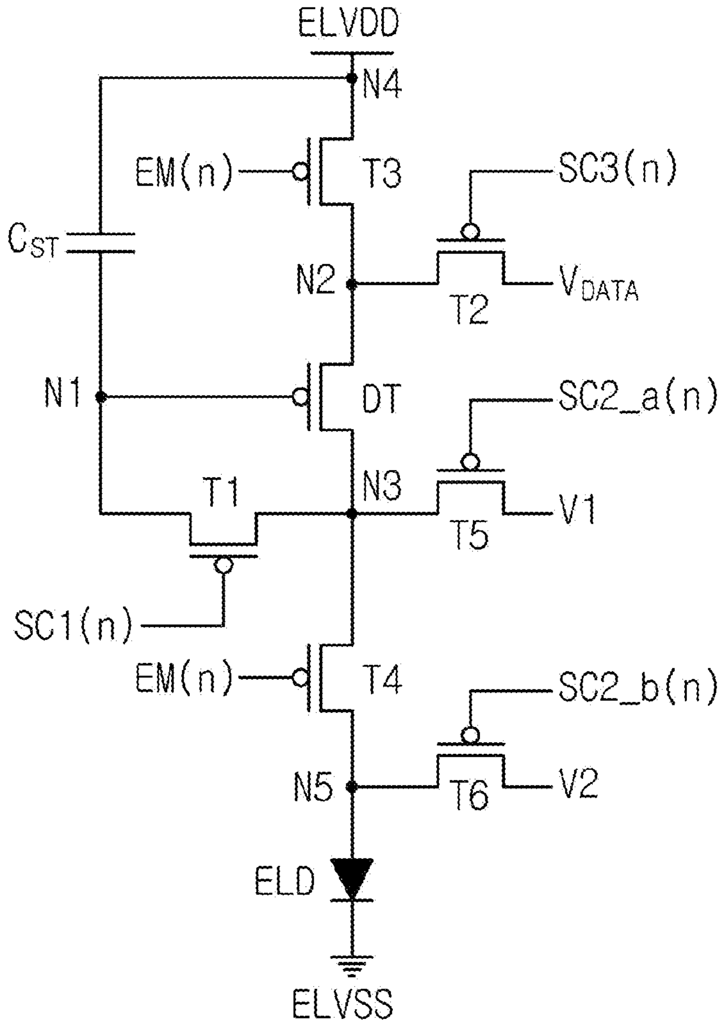

FIGS. 2A, 2B, and 2C are circuit diagrams of a pixel circuit of the electroluminescent display device according to the embodiment of the present invention.

FIGS. 2A, 2B, and 2C illustratively show the pixel driving circuit for description, and there is no limitation as long as the pixel driving circuit has a structure which is provided with the light emission signal EM and is capable of controlling the light emission of the electroluminescent device ELD. For example, the pixel driving circuit may include an additional scan signal, a switching TFT connected to the scan signal, and a switching TFT to which an additional initialization voltage is applied. Also, a connection relationship between switching elements or a connection position of the capacitor may be variously arranged. That is, since the light emission of the electroluminescent device ELD is controlled according to the change in the duty ratio of the light emission signal EM, as long as the light emission can be controlled according to the refresh rate, the pixel driving circuit having various structures may be used. For example, various pixel driving circuits such as 3T1C, 4T1C, 6T1C, 7T1C, and 7T2C or the like may be used, where T stands for transistor and C stands for capacitor. Hereinafter, for convenience of description, the electroluminescent display device having a pixel driving circuit of 7T1C of FIG. 2 will be described.

Referring to FIG. 2A, each of the plurality of pixels P may include a pixel circuit PC having a driving transistor DT, and the electroluminescent device ELD connected to the pixel circuit PC.

The pixel circuit PC may drive the electroluminescent device ELD by controlling a driving current Id flowing through the electroluminescent device ELD. The pixel circuit PC may include the driving transistor DT, first to sixth transistors T1 to T6, and a storage capacitor Cst. Each of the transistors DT and T1 to T6 may include a first electrode, a second electrode, and a gate electrode. One of the first electrode and the second electrode may be a source electrode, and the other of the first electrode and the second electrode may be a drain electrode.

Each of the transistors DT and T1 to T6 may be a PMOS transistor or an NMOS transistor. In the embodiments of FIGS. 2A and 2B, the first transistor T1 is an NMOS transistor, and the other transistors DT and T2 to T6 are PMOS transistors. Further, in the embodiment of FIG. 2C, the first transistor T1 is also composed of a PMOS transistor.

Hereinafter, a case where the first transistor T1 is an NMOS transistor and the other transistors DT and T2 to T6 are PMOS transistors will be described as an example. Accordingly, the first transistor T1 is turned on by being applied with a high voltage, and the other transistors DT and T2 to T6 are turned on by being applied with a low voltage.

According to an example, the first transistor T1 constituting the pixel circuit PC may function as a compensation transistor, the second transistor T2 may function as a data supply transistor, the third and fourth transistors T3 and T4 may function as light emission control transistors, The fifth and sixth transistors T5 and T6 may function as bias transistors.

The electroluminescent device ELD may include a pixel electrode (or an anode electrode) and a cathode electrode. The pixel electrode of the electroluminescent device ELD may be connected to a fifth node N5, and the cathode electrode may be connected to a second power supply voltage ELVSS.

The driving transistor DT may include the first electrode connected to a second node N2, the second electrode connected to a third node N3, and the gate electrode connected to a first node N1. The driving transistor DT may provide the driving current Id to the electroluminescent device ELD on the basis of the voltage of the first node N1 (or the data voltage stored in the capacitor Cst to be described later).

The first transistor T1 may include the first electrode connected to the first node N1, the second electrode connected to the third node N3, and the gate electrode which receives a first scan signal SC1. The first transistor T1 may be turned on in response to the first scan signal SC1 and may transmit the data signal Vdata to the first node N1. The first transistor T1 is diode-connected between the first node N1 and the third node N3, thereby sampling a threshold voltage Vth of the driving transistor DT. The first transistor T1 may be a compensation transistor.

The capacitor Cst may be connected or formed between the first node N1 and a fourth node N4. The capacitor Cst may store or maintain the provided data signal Vdata.

The second transistor T2 may include the first electrode connected to the data line DL (or receiving the data signal Vdata), the second electrode connected to the second node N2, and the gate electrode which receives a third scan signal SC3. The second transistor T2 may be turned on in response to the third scan signal SC3 and may transmit the data signal Vdata to the second node N2. The second transistor T2 may be a data supply transistor.

The third transistor T3 and the fourth transistor T4 (or the first and second light emission control transistors) may be connected between a first power supply voltage ELVDD and the electroluminescent device ELD, and may form a current moving path through which the driving current Id which is generated by the driving transistor DT moves.

The third transistor T3 may include the first electrode which is connected to the fourth node N4 and receives the first power supply voltage ELVDD, the second electrode which is connected to the second node N2, and the gate electrode which receives the light emission control signal ECS.

Similarly, the fourth transistor T4 may include the first electrode which is connected to the third node N3, the second electrode which is connected to the fourth node N4 (or the pixel electrode of the electroluminescent device ELD), and the gate electrode which receives the light emission control signal ECS.

The third and fourth transistors T3 and T4 are turned on in response to the light emission control signal ECS. In this case, the driving current Id is supplied to the electroluminescent device ELD, and the electroluminescent device ELD can emit light with a luminance corresponding to the driving current Id.

The fifth transistor T5 includes the first electrode which is connected to the third node N3, the second electrode which receives the first bias voltage V1, and the gate electrode which receives a second scan signal SC2.

The sixth transistor T6 may include the first electrode which is connected to the fifth node N5, the second electrode which receives the second bias voltage V2, and the gate electrode which receives the second scan signal SC2. In FIG. 2A, the gate electrodes of the fifth and sixth transistors T5 and T6 are configured to receive the second scan signal SC2 in common. However, the present invention is not necessarily limited thereto and, as shown in FIGS. 2B and 2C, the gate electrodes of the fifth and sixth transistors T5 and T6 may be configured to receive separate scan signals and to be controlled independently, respectively.

The sixth transistor T6 may include the first electrode which is connected to the fifth node N5, the second electrode which is connected to the second bias voltage V2, and the gate electrode which receives the second scan signal SC2. Before the electroluminescent device ELD emits light (or after the electroluminescent device ELD emits light), the sixth transistor T6 may be turned on in response to the second scan signal SC2 and may initialize the pixel electrode (or anode electrode) of the electroluminescent device ELD by using the second bias voltage V2. The electroluminescent device ELD may have a parasitic capacitor formed between the pixel electrode and the cathode electrode. Also, while the electroluminescent device ELD emits light, the parasitic capacitor is charged so that the pixel electrode of the electroluminescent device ELD may have a specific voltage. Accordingly, by applying the second bias voltage V2 to the pixel electrode of the electroluminescent device ELD through the sixth transistor T6, the amount of charge accumulated in the electroluminescent device ELD can be initialized.

The present disclosure relates to the electroluminescent display device using a variable refresh rate (VRR) mode. The VRR is a technology that drives the display device at a constant frequency and activates pixels by increasing the refresh rate at which the data voltage Vdata is updated when high-speed driving is required, and drives pixels by reducing the refresh rate when it is necessary to reduce power consumption or low-speed driving is required.

Each of the plurality of pixels P may be driven through a combination of a refresh frame and a hold frame within one second. In this specification, one set is defined as that the refresh frame in which the data voltage Vdata is updated is repeated. Also, one set period is a cycle in which the refresh frame in which the data voltage Vdata is updated is repeated.

When the pixel is driven at the refresh rate of 120 Hz, the pixel can be driven only by the refresh frame. That is, the refresh frame can be driven 120 times within one second. One refresh frame period is $1/120$=8.33 ms, and one set period is also 8.33 ms.

When the pixel is driven at the refresh rate of 60 Hz, the refresh frame and the hold frame may be alternately driven. That is, the refresh frame and the hold frame may be alternately driven 60 times within one second. One refresh frame period and one hold frame period are 0.5/60=8.33 ms, respectively, and one set period is 16.66 ms.

When the pixel is driven at the refresh rate of 1 Hz, one frame may be driven with one refresh frame and with 119 hold frames after the one refresh frame. One refresh frame period and one hold frame period are $1/120$=8.33 ms, respectively, and one set period is 1 s. FIGS. 3A to 3K are views for describing the driving of the electroluminescent device and the refresh frame in the pixel circuit of the display device shown in FIG. 2.

Figure 4A:
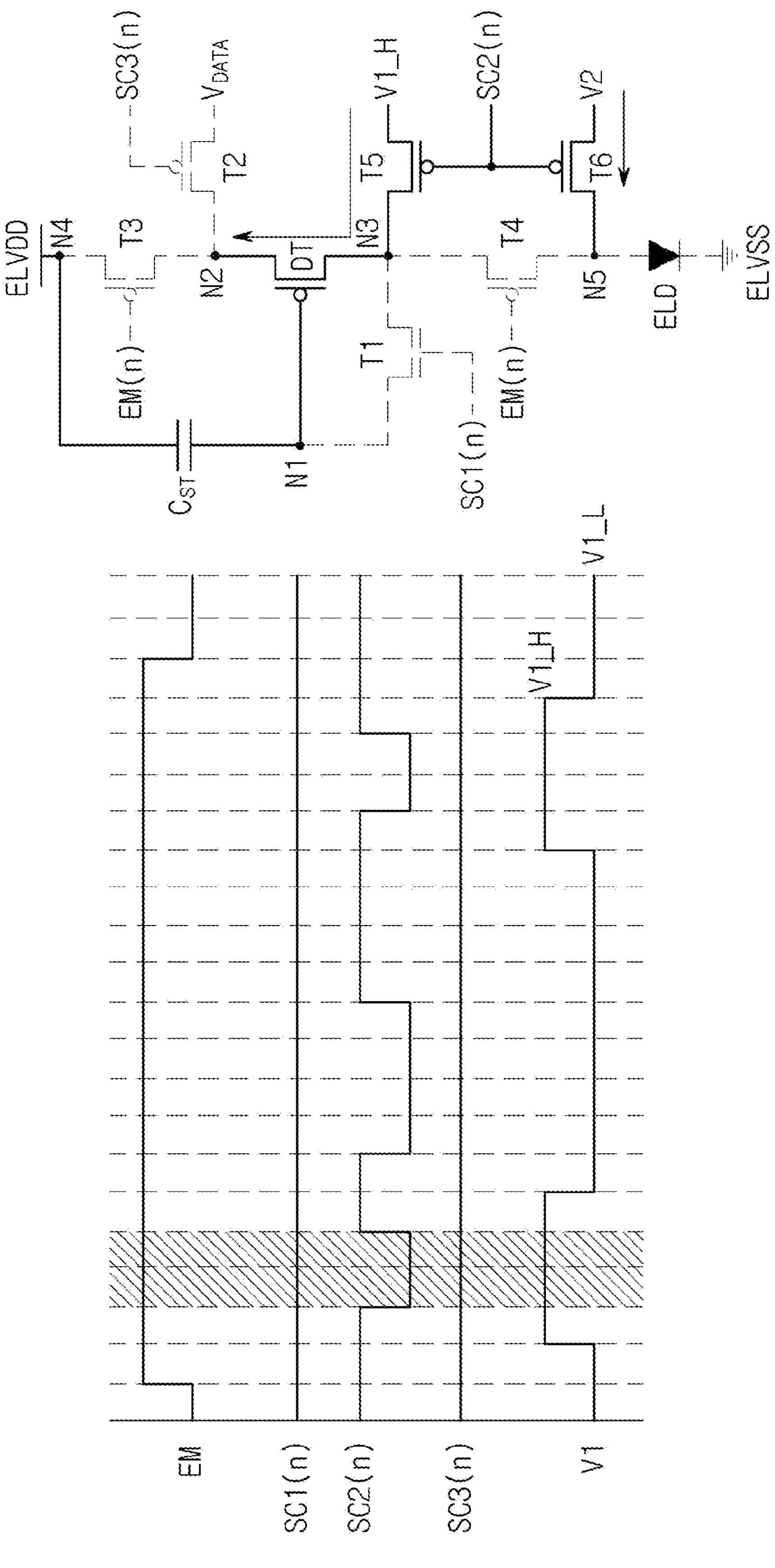
FIGS. 4A, 4B, and 4C are views for describing the driving of the electroluminescent device and the pixel circuit of a hold frame in the pixel circuit of the display device shown in FIGS. 2A, 2B, and 2C.
Figure 4B:
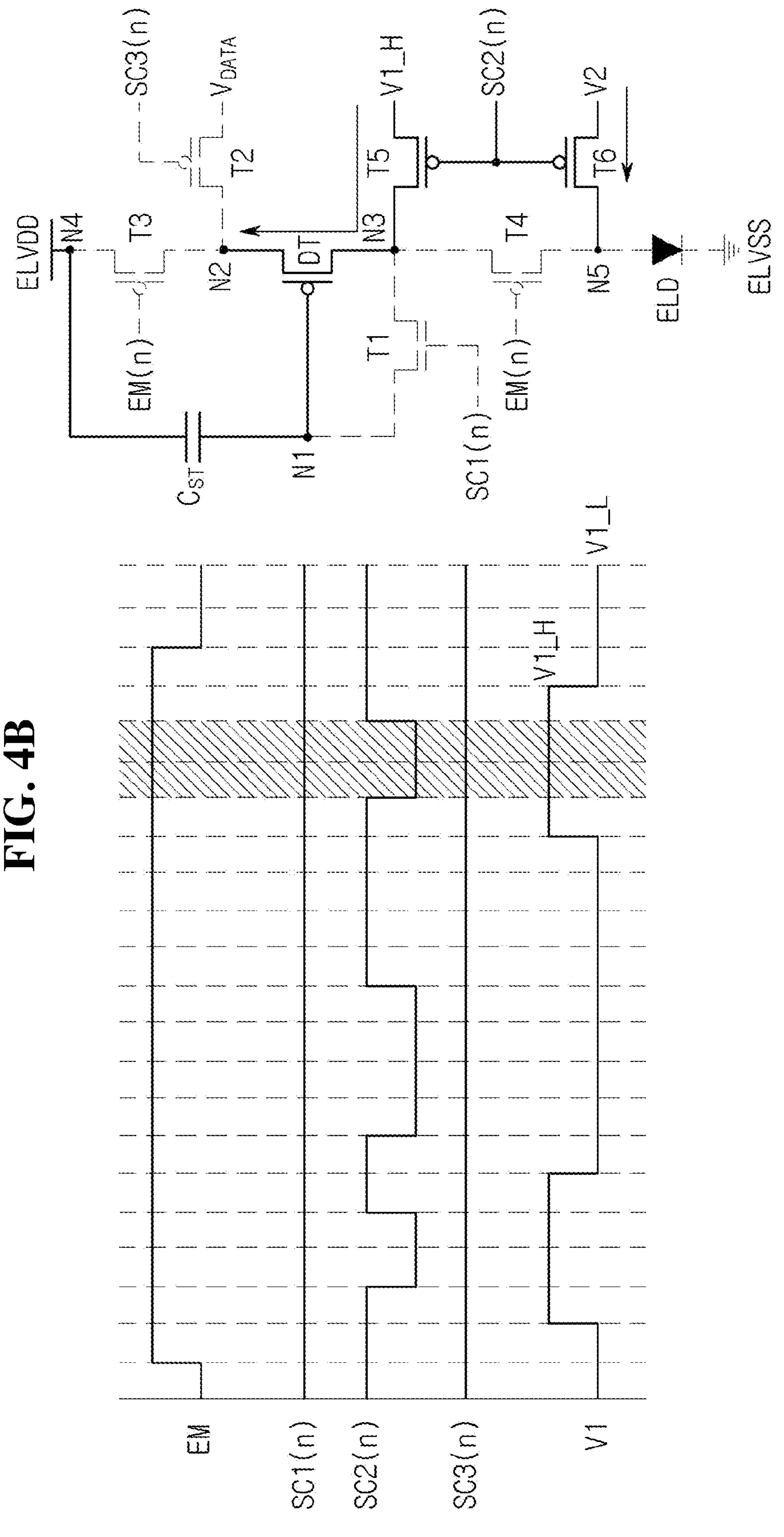
Figure 4C:
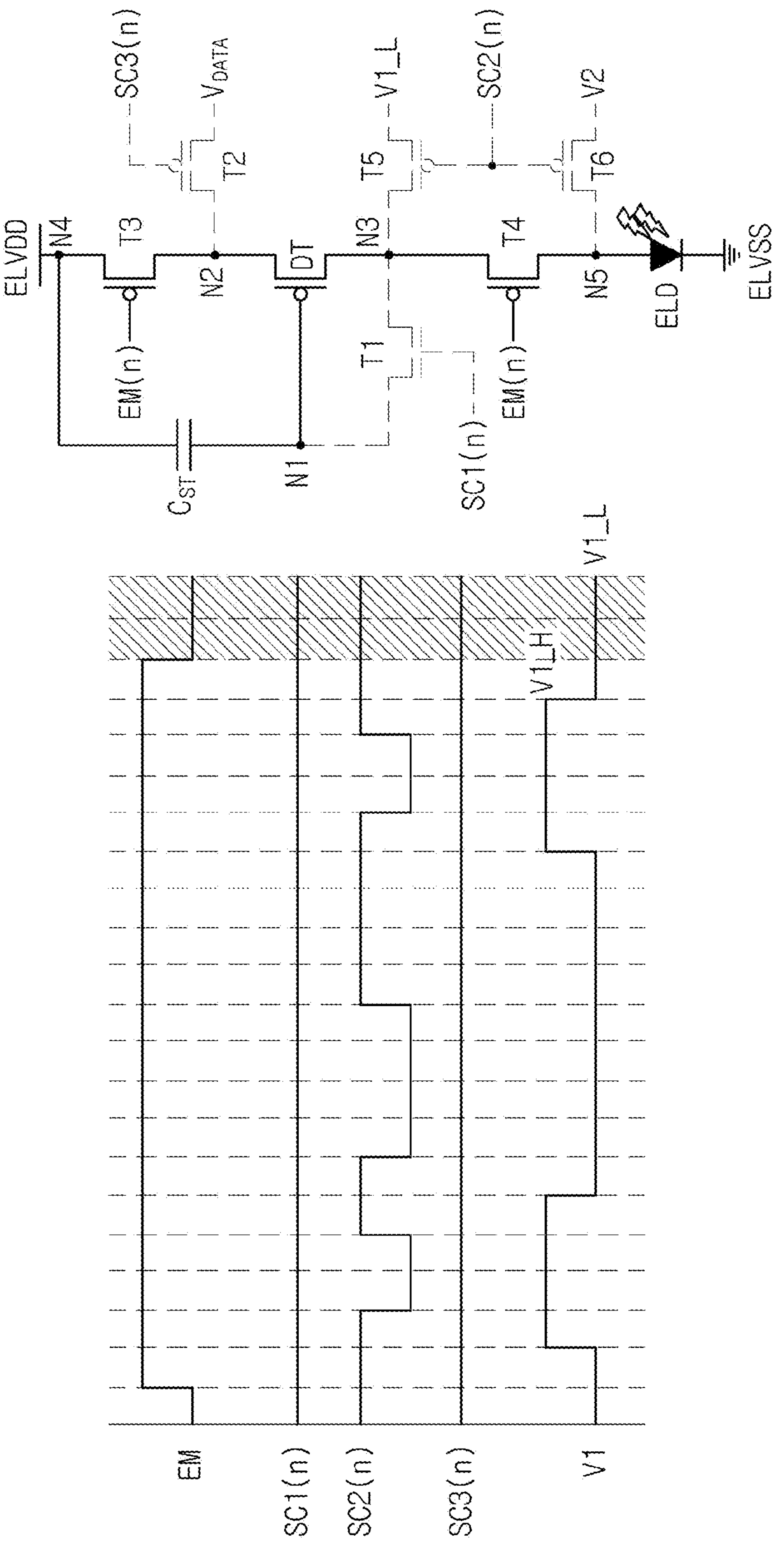

FIGS. 4A, 4B, and 4C are views for describing the driving of the electroluminescent device and the pixel circuit of the hold frame in the pixel circuit of the display device shown in FIGS. 2A, 2B, and 2C.

While, in the refresh frame, a new data signal Vdata is charged and applied to the gate electrode of the driving transistor DT, in the hold frame, the data signal Vdata of the previous frame is maintained and used. Meanwhile, the hold frame is also referred to as a skip frame in that the process of applying the new data signal Vdata to the gate electrode of the driving transistor DT is omitted.

Each of the plurality of pixels P may initialize a voltage which is charged or remains in the pixel circuit PC during the refresh period. Specifically, each of the plurality of pixels P may remove the influence of the driving voltage VDD and the data voltage Vdata stored in the previous frame in the refresh frame. Accordingly, each of the plurality of pixels P may display an image corresponding to the new data voltage Vdata in the hold period.

Each of the plurality of pixels P may display the image by providing the driving current Id corresponding to the data voltage Vdata to the electroluminescent device ELD during the hold frame period, and may maintain the turn-on state of the electroluminescent device ELD.

First, the driving of the electroluminescent device and the pixel circuit of the refresh frame will be described with reference to FIG. 3. The refresh frame may operate including at least one bias section, an initialization section, a sampling section, and a light emission section. However, this is only an embodiment and is not necessarily limited to this order.

Figure 3A:
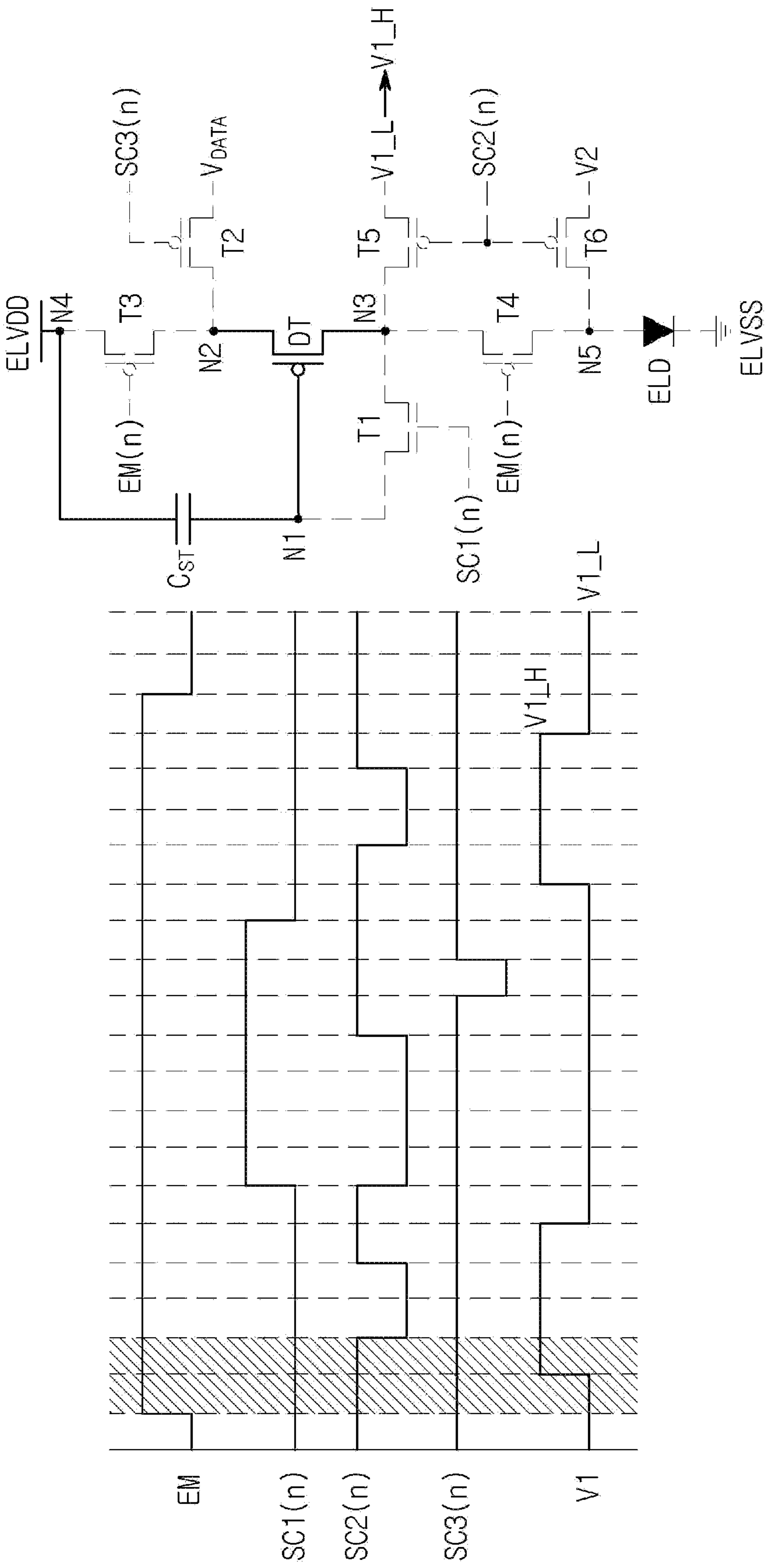
FIGS. 3A to 3K are view for describing the driving of an electroluminescent device and the pixel circuit of a refresh frame in the pixel circuit of the display device shown in FIGS. 2A, 2B, and 2C.
Figure 3B:
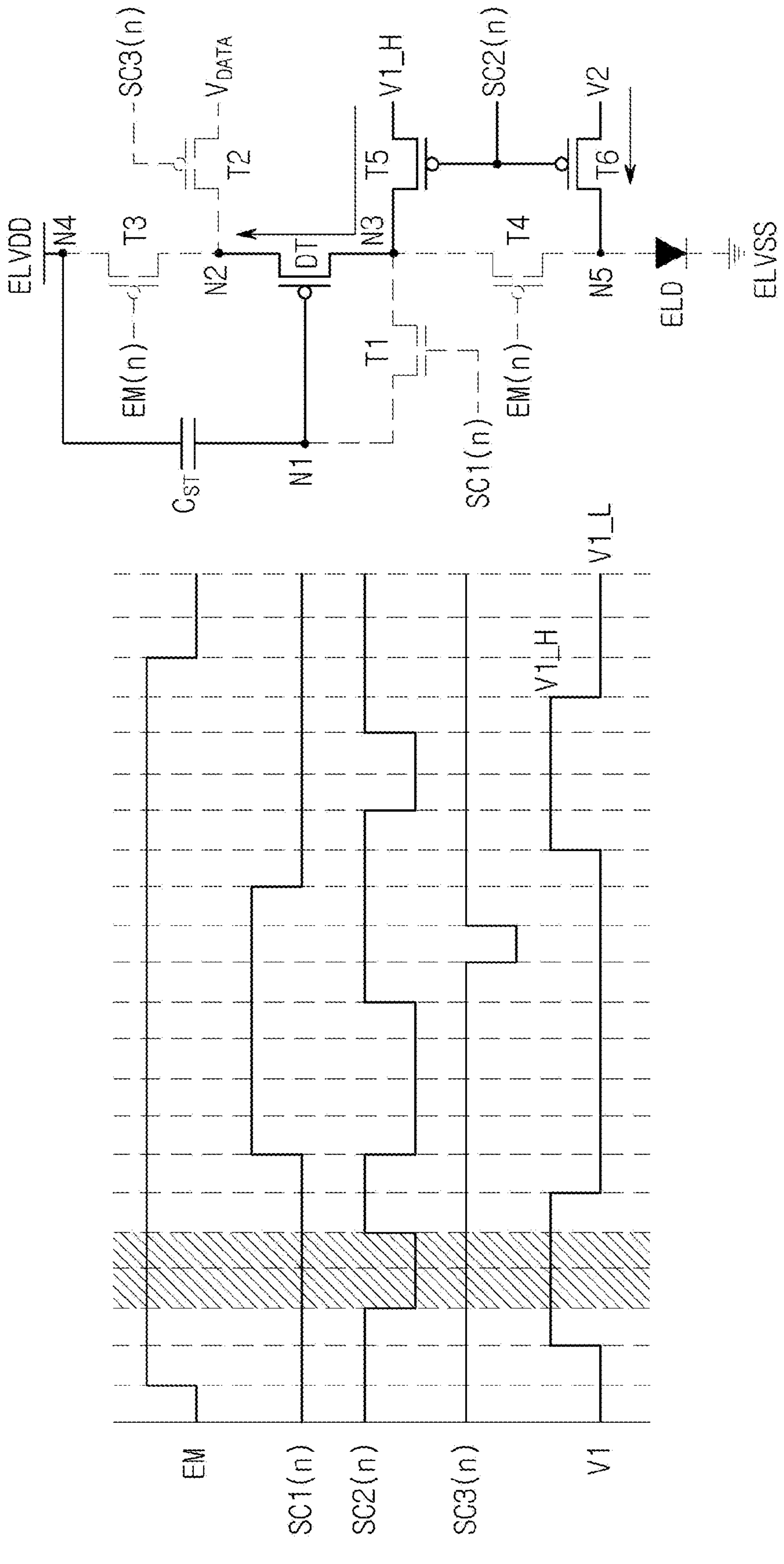
Figure 3C:
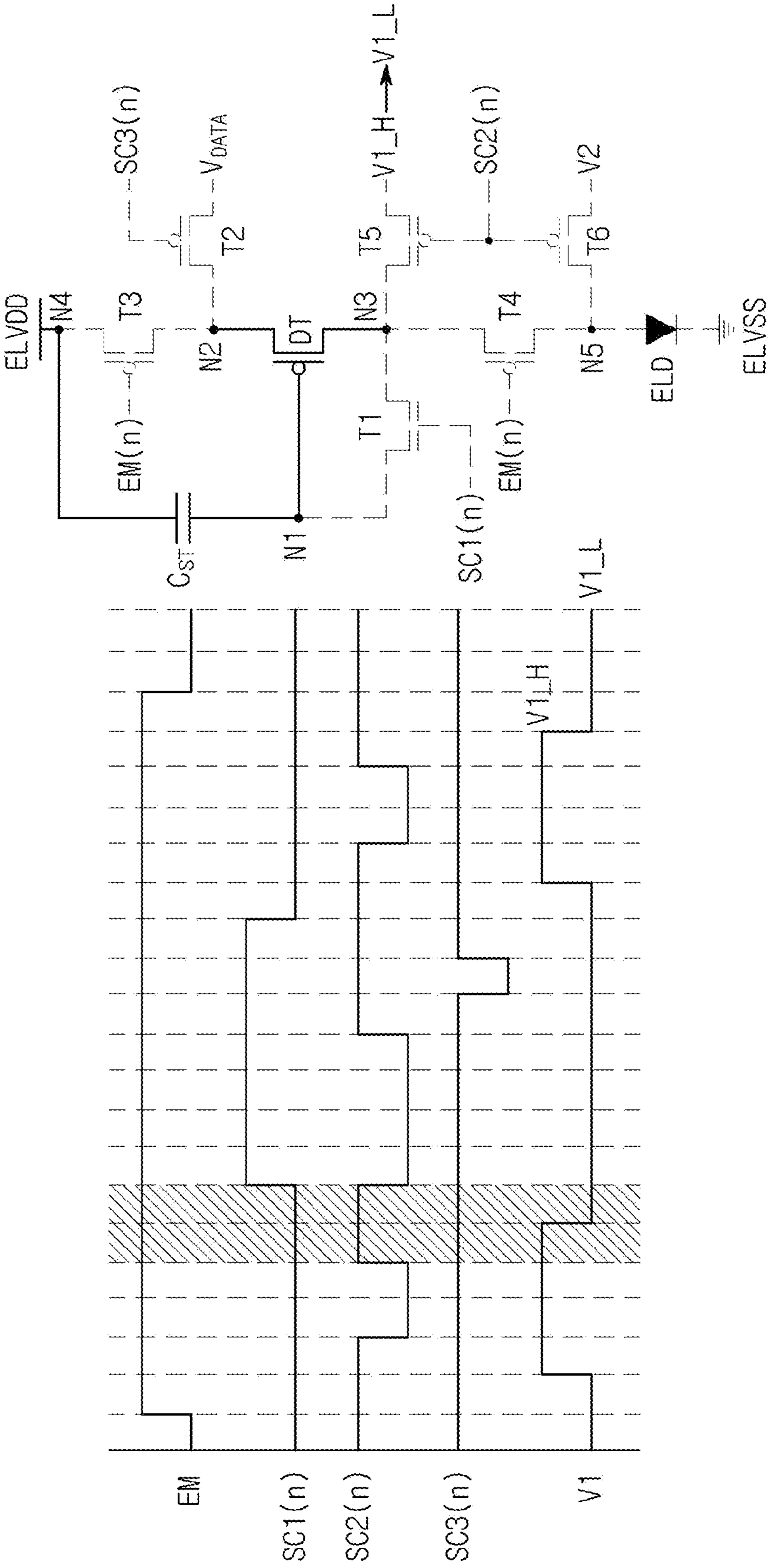

FIGS. 3A, 3B, and 3C show a first bias section.

In FIG. 3A, a section in which the first bias voltage V1 is changed from a first voltage to a second voltage is shown. The light emission control signal ECS represents a high voltage, and the third and fourth transistors T3 and T4 are turned off. The first voltage is represented as V1_L, and the second voltage is represented as V1_H. The V1_H is higher than the V1_L, and it is preferable that the V1_H is higher than the data voltage Vdata. The first scan signal SC1 is a low voltage and the first transistor T1 is turned off. The second and third scan signals SC2 and SC3 are high voltages, and the second, fifth, and sixth transistors T2, T5, and T6 are turned off. The voltage of the gate electrode of the driving transistor DT connected to the first node N1 is Vdata(n−1)−|Vth|, that is, a difference between the data voltage Vdata(n−1) of the previous frame n−1 and the threshold voltage Vth of the driving transistor DT.

In FIG. 3B, the low second scan signal SC2 is input, and the fifth and sixth transistors T5 and T6 are turned on. As the fifth transistor T5 is turned on, the first bias voltage V1 (V1_H) is applied to the first electrode of the driving transistor DT connected to the second node N2. The voltage of the first electrode of the driving transistor DT connected to the second node N2 increases to the voltage V1_H. The driving transistor DT may be a PMOS transistor, and in this case, the first electrode may be a source electrode. Here, the voltage Vgs between the gate and the source of the driving transistor DT is $$Vgs = V\text{data}(n-1) - |Vth| - V1\_H.$$

Here, the first bias voltage V1=V1_H is supplied to the third node N3, that is the drain electrode of the driving transistor DT, so that the charging time or charging delay of the voltage of the fifth node N5 that is the anode electrode of the electroluminescent device ELD can be reduced in the light emission section. The driving transistor DT maintains a stronger saturation. For example, as the first bias voltage V1=V1_H increases, the voltage of the third node N3 that is the drain electrode of the driving transistor DT may increase and a gate-source voltage or a drain-source voltage of the driving transistor DT may decrease. Therefore, it is preferable that the first bias voltage V1_H is at least higher than the data voltage Vdata. Here, the magnitude of the drain-source current Id passing through the driving transistor DT may be reduced, and the stress of the driving transistor DT is reduced in a positive bias stress situation, thereby eliminating the charging delay of the voltage of the third node N3. In other words, the Vgs of the driving transistor DT is biased to the Vdata before the threshold voltage Vth of the driving transistor DT is sampled, so that the hysteresis of the driving transistor DT can be reduced. Accordingly, on-bias stress can be defined as an operation to apply directly a suitable bias voltage (for example, V1=V1_H) to the driving transistor DT during non-light emission periods.

Also, as the sixth transistor T6 is turned on in the first bias section, the pixel electrode (or anode electrode) of the electroluminescent device ELD connected to the fifth node N5 is initialized to the second bias voltage V2. However, the gate electrodes of the fifth and sixth transistors T5 and T6 may be configured to receive separate scan signals and to be controlled independently, respectively. That is, it is not necessarily required to simultaneously apply the bias voltage to the source electrode of the driving transistor DT and the pixel electrode of the electroluminescent device ELD in the first bias section.

In FIG. 3C, the high second scan signal SC2 is input, and the first bias voltage V1 is changed from V1_H to V1_L. As the high second scan signal SC2 is input, the fifth and sixth transistors T5 and T6 are turned off.

Figure 3D:
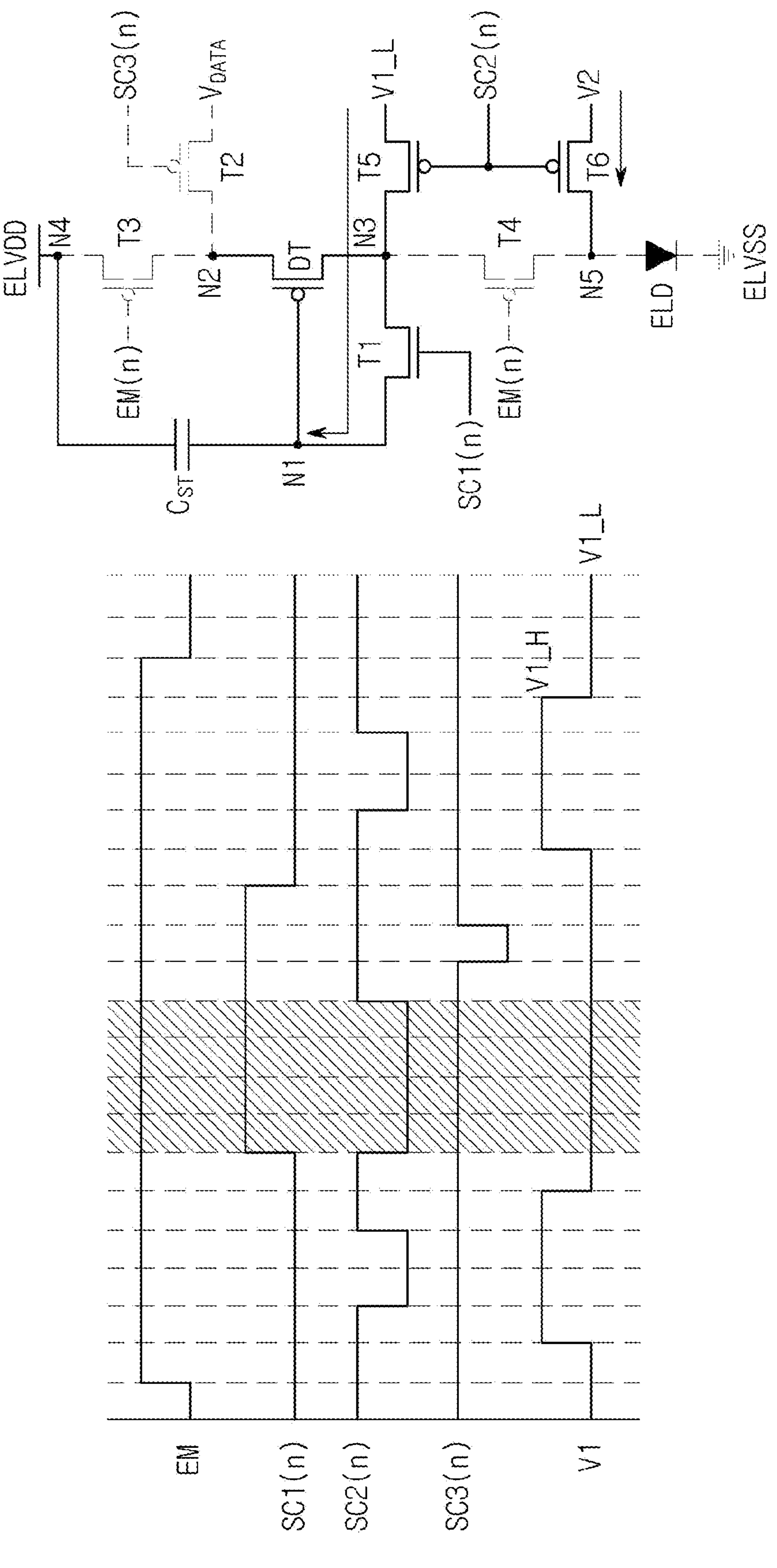

FIG. 3D shows the initialization section. In the initialization section, the voltage of the gate electrode of the driving transistor DT is initialized.

In FIG. 3D, the first scan signal SC1 represents a high voltage, and the first transistor T1 is turned on. The second scan signal SC2 represents a low voltage, and the fifth and sixth transistors T5 and T6 are turned on. As the first and fifth transistors T1 and T5 are turned on, the voltage of the gate electrode of the driving transistor DT connected to the first node N1 is initialized to the voltage V1_L. Also, as the sixth transistor T6 is turned on, the pixel electrode (or anode electrode) of the electroluminescent device ELD is initialized to the second bias voltage V2. However, as described above, the gate electrodes of the fifth and sixth transistors T5 and T6 may be configured to receive separate scan signals and to be controlled independently, respectively. That is, it is not necessarily required to simultaneously apply the bias voltage to the source electrode of the driving transistor DT and the pixel electrode of the electroluminescent device ELD in the first bias section.

Figure 3E:
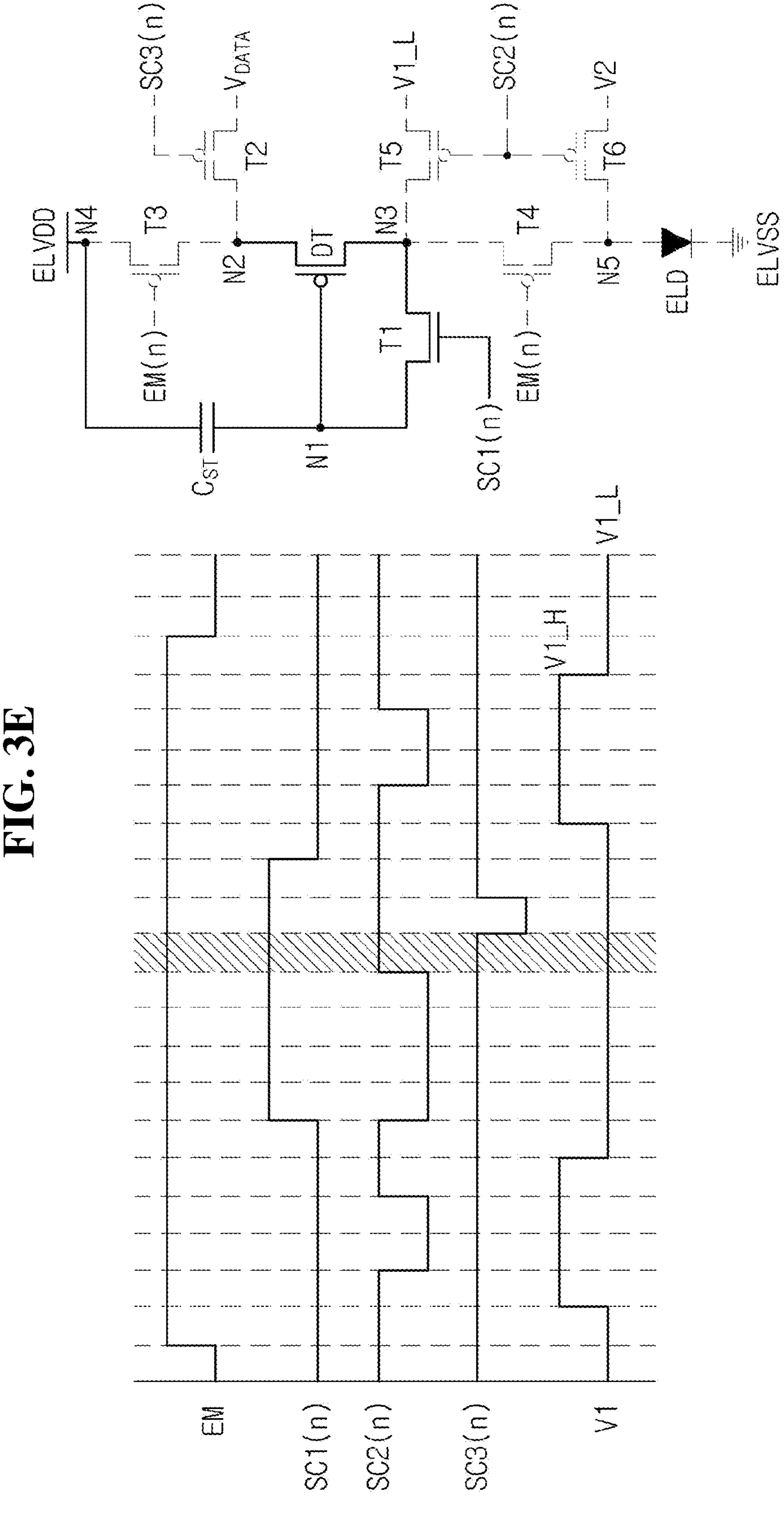
Figure 3F:
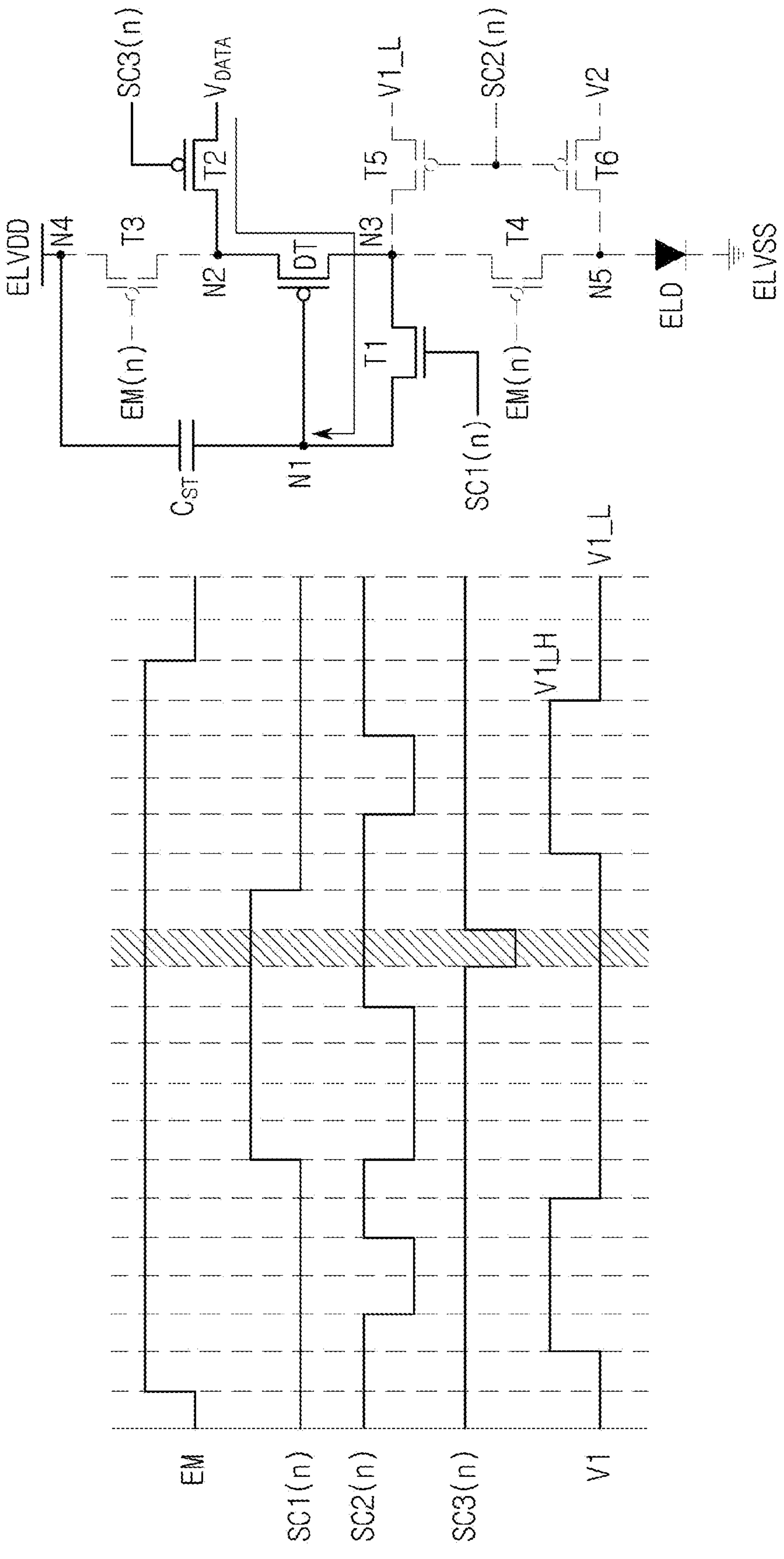
Figure 3G:
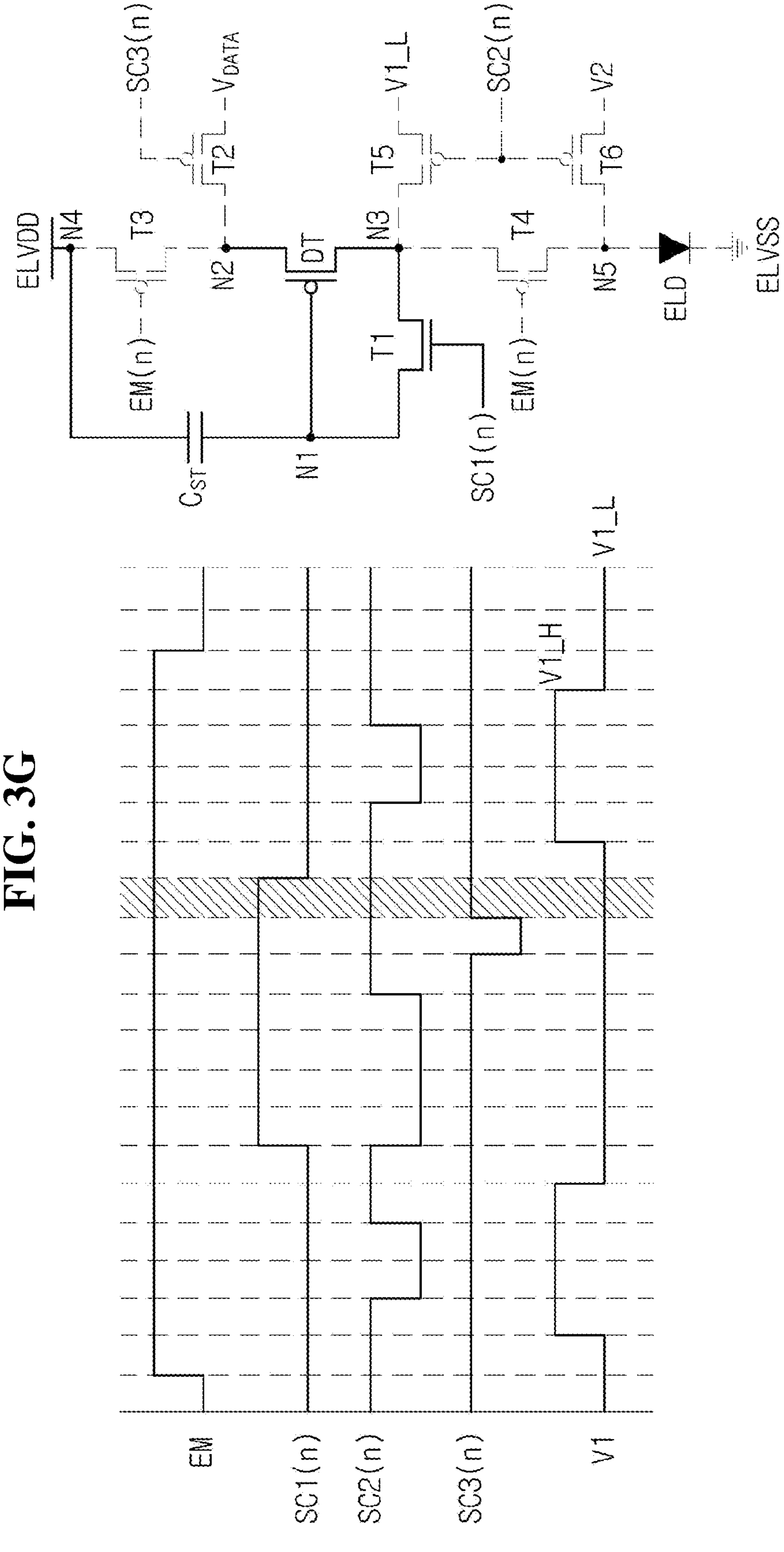

FIGS. 3E to 3G show sampling sections. In the sampling section, the data voltage and the threshold voltage Vth of the driving transistor DT are sampled and stored at the first node N1.

In FIG. 3E, the high second scan signal SC2 is input, and the fifth and sixth transistors T5 and T6 are turned off. The first transistor T1 maintains an on-state.

In FIG. 3F, the low third scan signal SC3 is input, and the second transistor T2 is turned on. As the second transistor T2 is turned on, the voltage of Vdata(n) of the current frame n is applied to the source electrode of the driving transistor DT connected to the second node N2. Also, the first transistor T1 maintains an on-state. Since the driving transistor DT is diode-connected in the state where the first transistor T1 is turned on, the voltage of the gate electrode of the driving transistor DT connected to the first node N1 is Vdata(n)−|Vth|. That is, the first transistor T1 is diode-connected between the first node N1 and the third node N3, thereby sampling the threshold voltage Vth of the driving transistor DT.

In FIG. 3G, the high third scan signal SC3 is input, and the second transistor T2 is turned off.

Figure 3H:
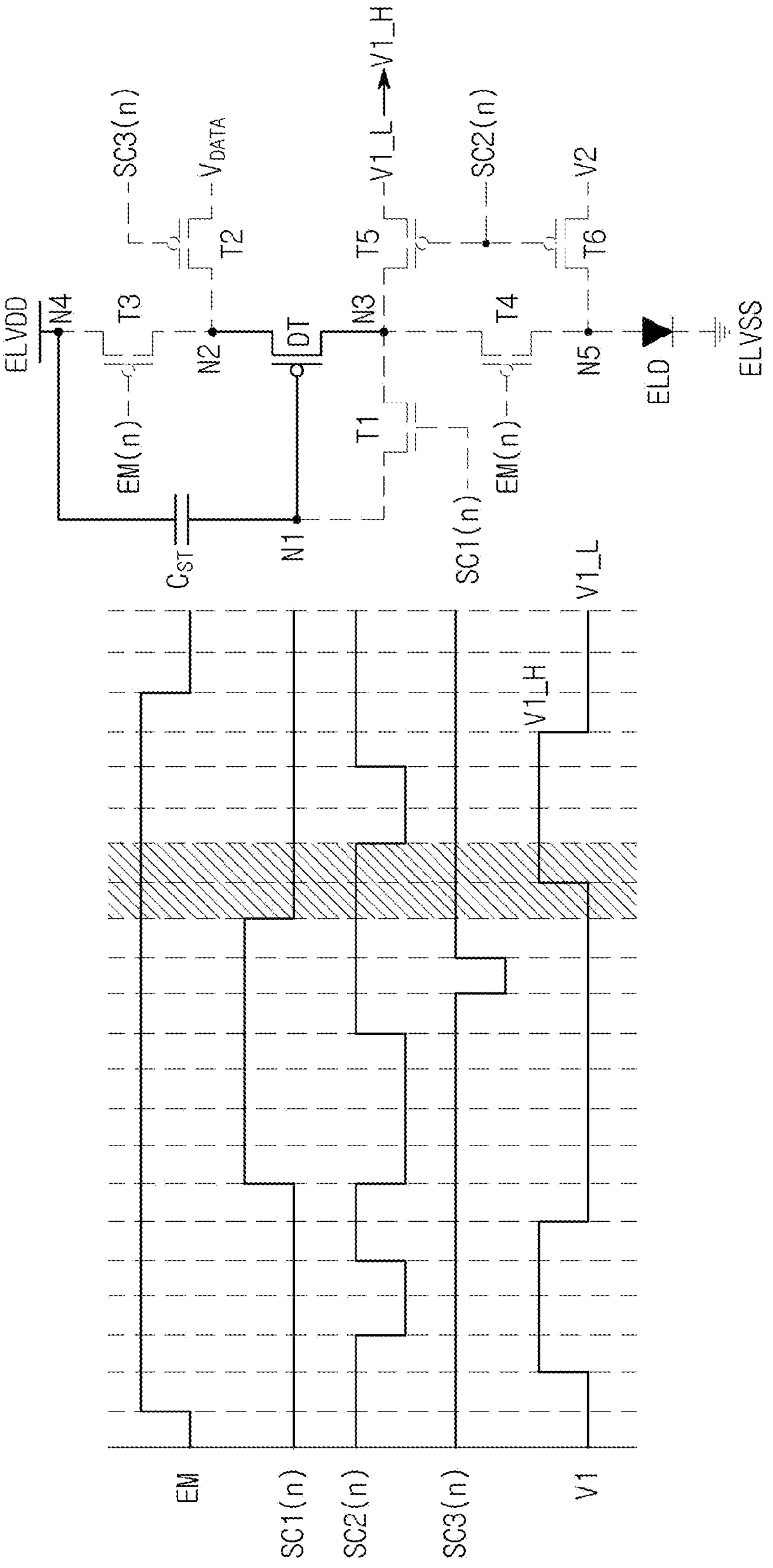
Figure 3I:
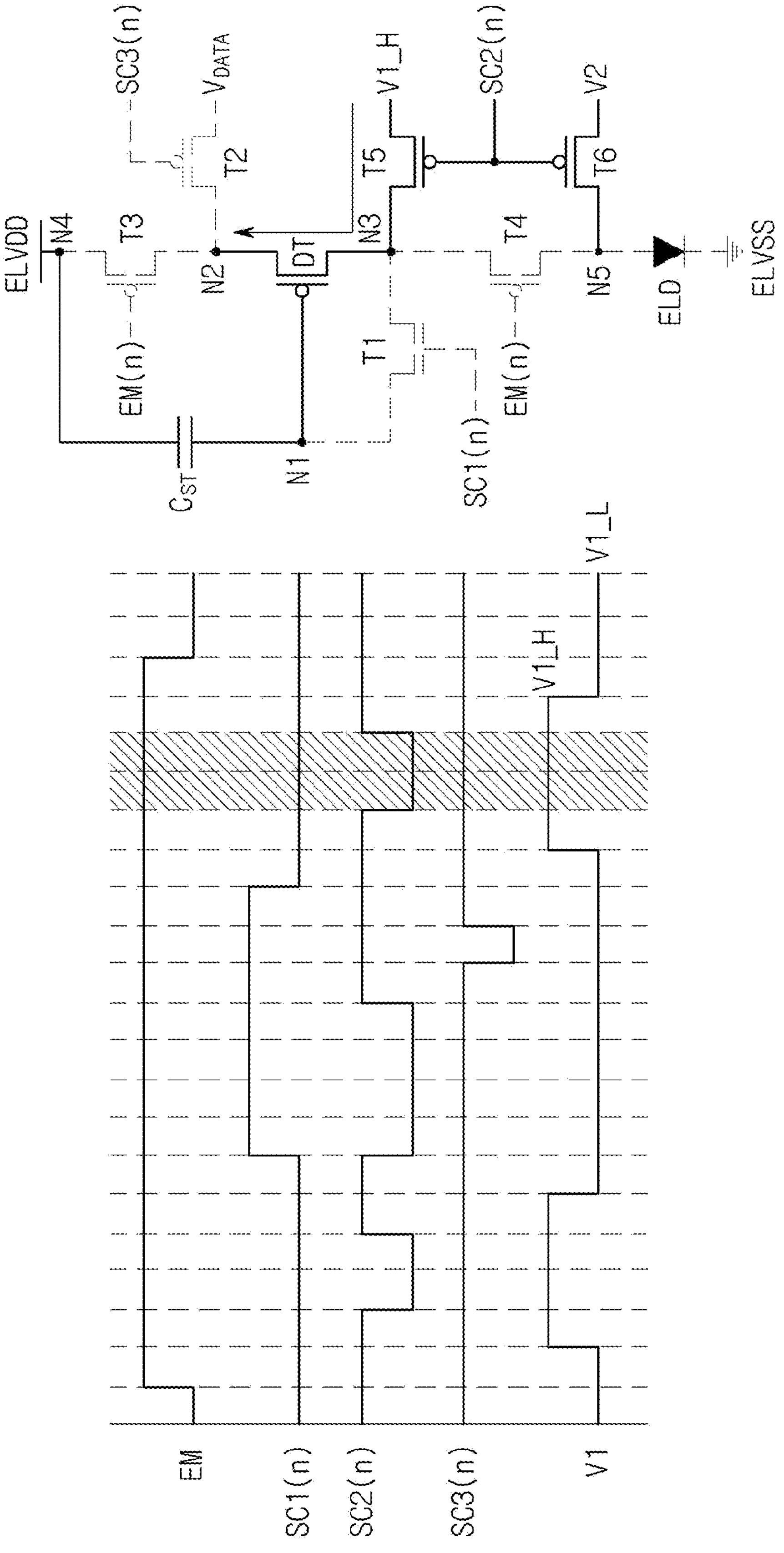
Figure 3J:
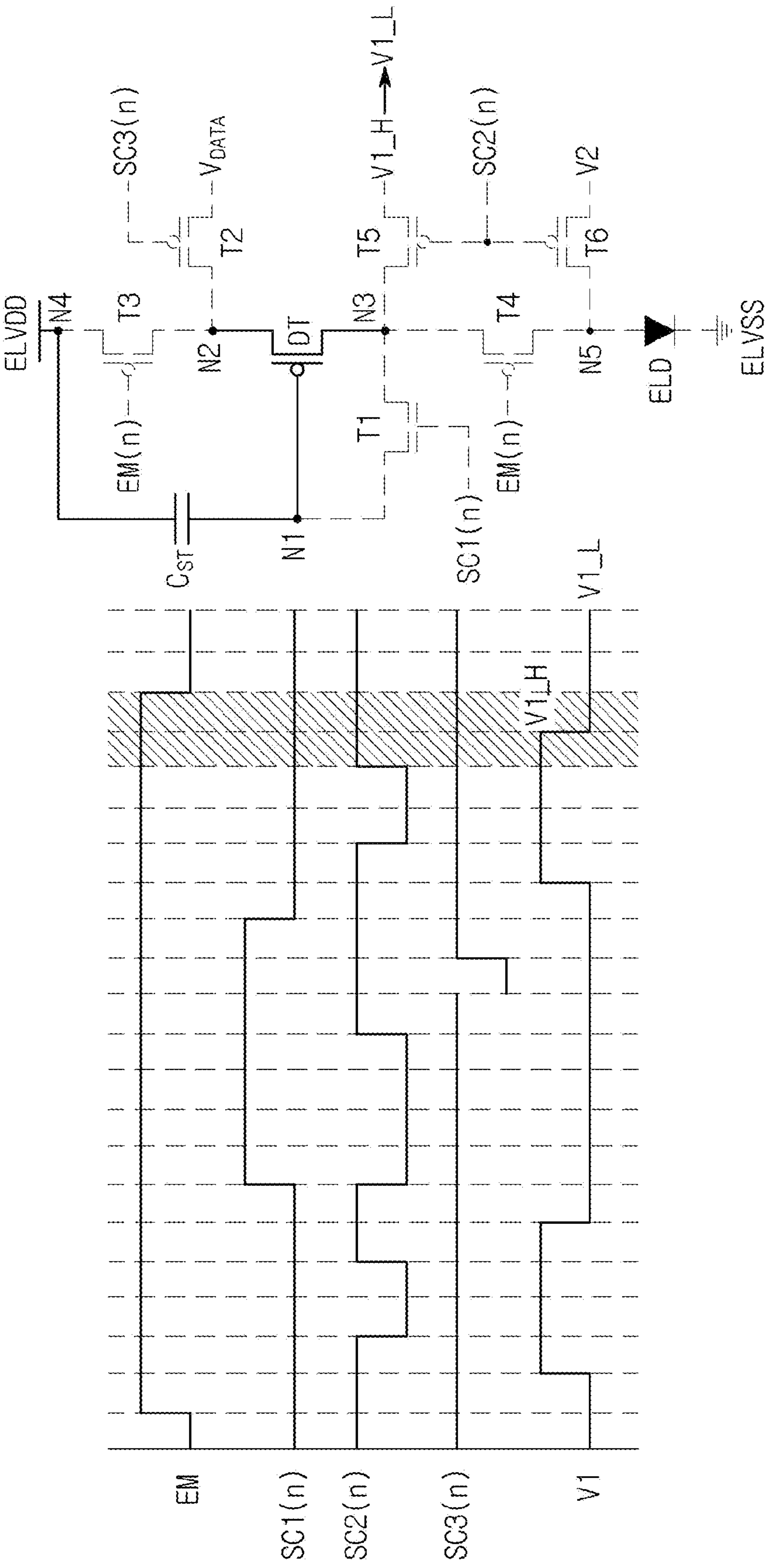

FIGS. 3H to 3J show a second bias section.

Since a driving waveform in the second bias section is the same as that of the first bias section, a detailed description thereof will be omitted.

In FIG. 3H, the first bias voltage V1 is changed from V1_L to V1_H.

In FIG. 3I, as the fifth transistor T5 is turned on, the voltage of the first electrode of the driving transistor DT connected to the second node N2 increases to the voltage V1_H. Here, the voltage Vgs between the gate and the source of the driving transistor DT is Vgs=Vdata(n)−|Vth|−V1_H. That is, the driving transistor DT maintains a stronger saturation. Also, as the sixth transistor T6 is turned on, the pixel electrode (or anode electrode) of the electroluminescent device ELD is initialized to the second bias voltage V2. The voltage of the gate electrode of the driving transistor DT connected to the first node N1 maintains Vdata(n)−|Vth|.

In FIG. 3J, the high second scan signal SC2 is input, and the first bias voltage V1 is changed from V1_H to V1_L. As the high second scan signal SC2 is input, the fifth and sixth transistors T5 and T6 are turned off. The voltage of the gate electrode of the driving transistor DT connected to the first node N1 maintains Vdata(n)−|Vth|.

Figure 3K:
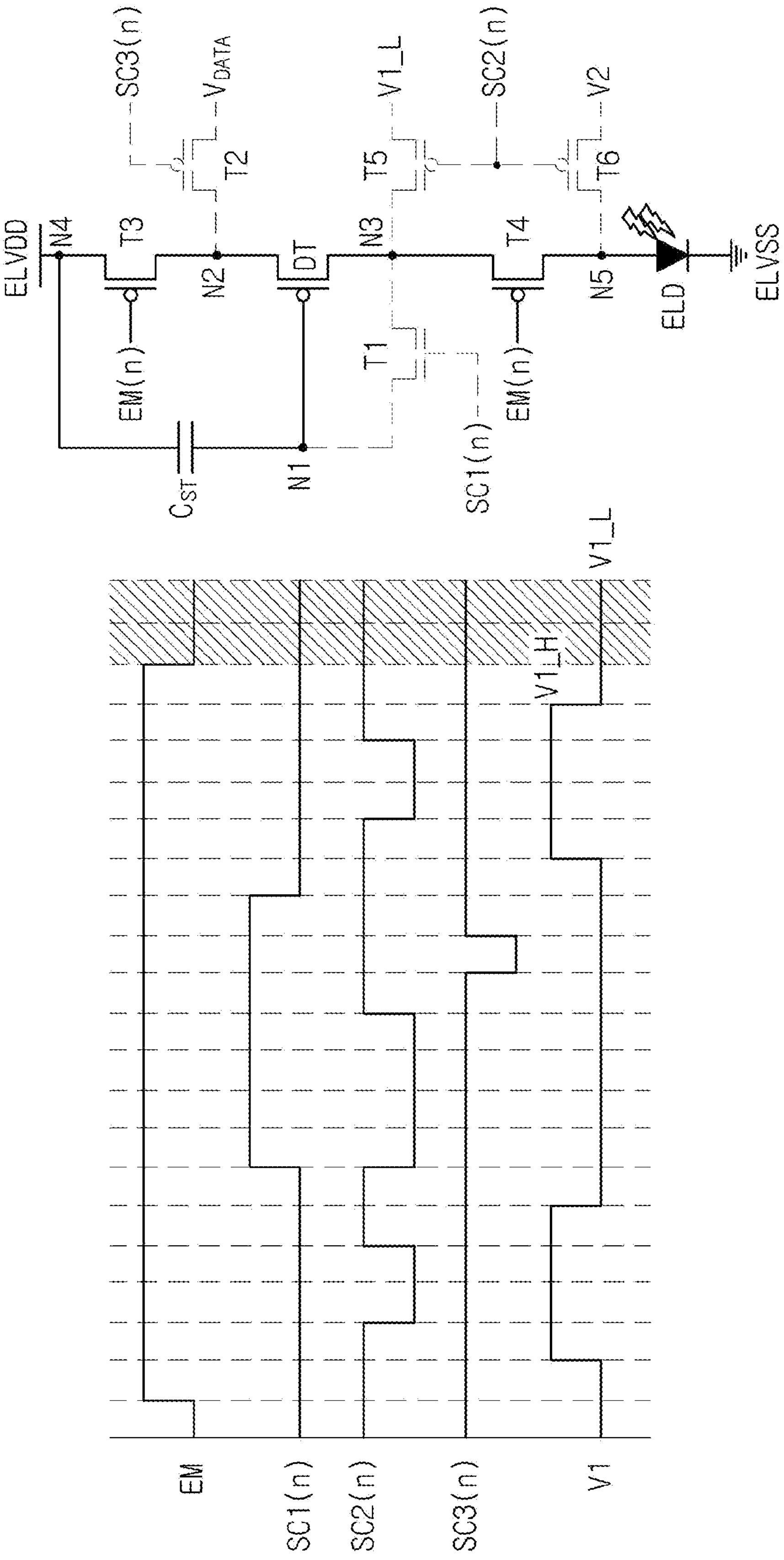

FIG. 3K shows the light emission section. In the light emission section, the sampled threshold voltage Vth is canceled and the electroluminescent device ELD is caused to emit light with a driving current corresponding to the sampled data voltage.

In FIG. 3K, the light emission control signal ECS represents a low voltage, and the third and fourth transistors T3 and T4 are turned on.

As the third transistor T3 is turned on, the first power supply voltage ELVDD connected to the fourth node N4 is applied to the source electrode of the driving transistor DT connected to the second node N2 through the third transistor T3. The driving current Id supplied by the driving transistor DT to the electroluminescent device ELD via the fourth transistor T4 becomes irrelevant to the value of the threshold voltage Vth of the driving transistor DT, so that the threshold voltage Vth of the driving transistor DT is compensated and operated.

Next, the driving of the electroluminescent device and the pixel circuit of the hold frame will be described with reference to FIGS. 4A, 4B, and 4C. The hold frame may include at least one bias section and the light emission section.

As described above, the refresh frame and the hold frame are different in that while, in the refresh frame, a new data signal Vdata is charged and applied to the gate electrode of the driving transistor DT, in the hold frame, the data signal Vdata of the previous frame is maintained and used. Therefore, unlike the refresh frame, the hold frame does not require the initialization section and the sampling period.

FIGS. 4A and 4B show the first and second bias sections, and FIG. 4C shows the light emission section.

In the operation of the hold frame, even one bias period may be sufficient. However, in this embodiment, for convenience of the driving circuit, the second scan signal SC2 is driven in the same manner as the second scan signal SC2 of the refresh frame, and thus, there are two bias sections.

The drive signal in the refresh frame described with reference to FIGS. 3A to 3K and the drive signal in the hold frame in FIGS. 4A to 4C are different due to the first and third scan signals SC1 and SC3. The initialization section and the sampling section are not required in the hold frame. Therefore, unlike the refresh frame, the first scan signal SC1 is always in a low state, and the third scan signal SC3 is always in a high state. That is, the first and second transistors T1 and T2 are always turned off.

Figure 5:
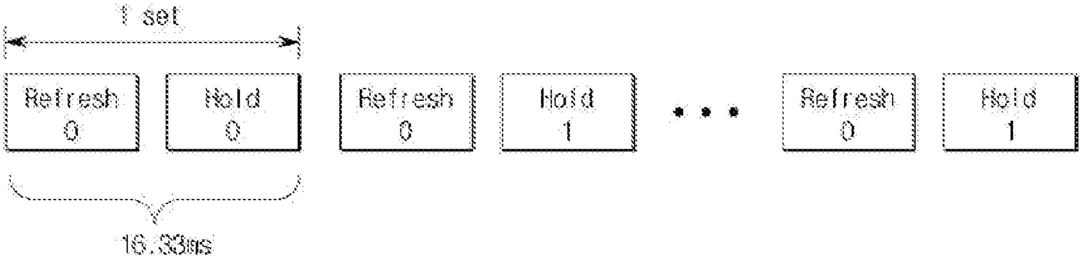
FIG. 5 is a view for describing a problem that a difference in luminance occurs when switching the refresh rate from 60 Hz to 1 Hz in the use of a VRR mode.
Figure 5:
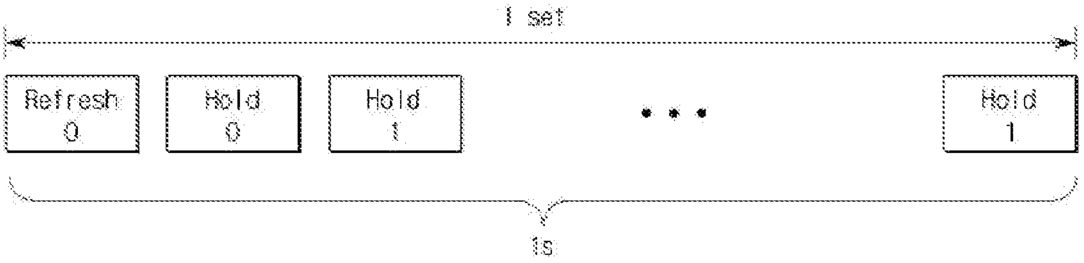

FIG. 5 is a view for describing a problem of the occurrence of a luminance difference when switching the refresh rate from 60 Hz to 1 Hz in the use of the VRR mode.

A case where the refresh rate is 60 Hz is shown in part (a) of FIG. 5, and a case where the refresh rate is 1 Hz is shown in part (b) of FIG. 5. The refresh frame period and hold frame period of each of the cases are 1/120 second (=8.33 ms), respectively. When the pixel is driven at the refresh rate of 60 Hz, one set period is 1/60 second (=16.66 ms), and when the pixel is driven at the refresh rate of 1 Hz, one set period is 1 second (=1 s).

As shown in part (a) of FIG. 5, when the pixel is driven at the refresh rate of 60 Hz, the refresh frame and the hold frame may be alternately driven. Accordingly, the bias voltage applied in the hold frame may be reset without being accumulated, by the initialization section of the refresh frame.

However, as shown in part (b) of FIG. 5, when the pixel is driven at the refresh rate of 1 Hz, the refresh frame is continuously followed by the hold frame. Accordingly, the bias voltage applied in the hold frame is accumulated as a stress voltage of the driving transistor DT. As the number of times the bias voltage is applied to the driving transistor DT increases, the charge of the driving transistor DT increases and then the driving transistor DT is saturated. That is, when the pixel is driven at 60 Hz and at 1 Hz, the characteristics of the driving transistor DT are changed, resulting in a difference in luminance.

The difference in the characteristics of the driving transistor DT between the driving at 60 Hz and the driving at 1 Hz results from a difference in the amount of bias stress within one set. That is, while, when the pixel is driven at the refresh rate of 60 Hz, there is one hold frame in one set, so that the bias stress is one time, when the pixel is driven at the refresh rate of 1 Hz, there are 119 hold frames in one set, so that the bias stress is 119 times. Thus, a difference in the amount of bias stress occurs. As a result, the characteristics of the driving transistor DT are changed and a difference in luminance occurs. In other words, when the pixel is driven by changing the refresh rate from a high refresh rate (e.g., 60 Hz) to a low refresh rate (e.g., 1 Hz), a difference in the amount of bias stress of the driving transistor DT occurs, and this causes the change of the characteristics of the driving transistor DT, so that the magnitude of the driving current Id is reduced. As a result, when the pixel is driven by changing the refresh rate from a high refresh rate to a low refresh rate, the luminance of the electroluminescent device ELD decreases due to a decrease in the driving current Id. This is perceived as flicker by viewers at a point of time when the refresh rate changes.

In the display device provided by the present invention, the pixel circuit may be driven by switching from the first refresh rate RR1 to the second refresh rate RR2 which is lower than the first refresh rate RR1.

Figure 6A:
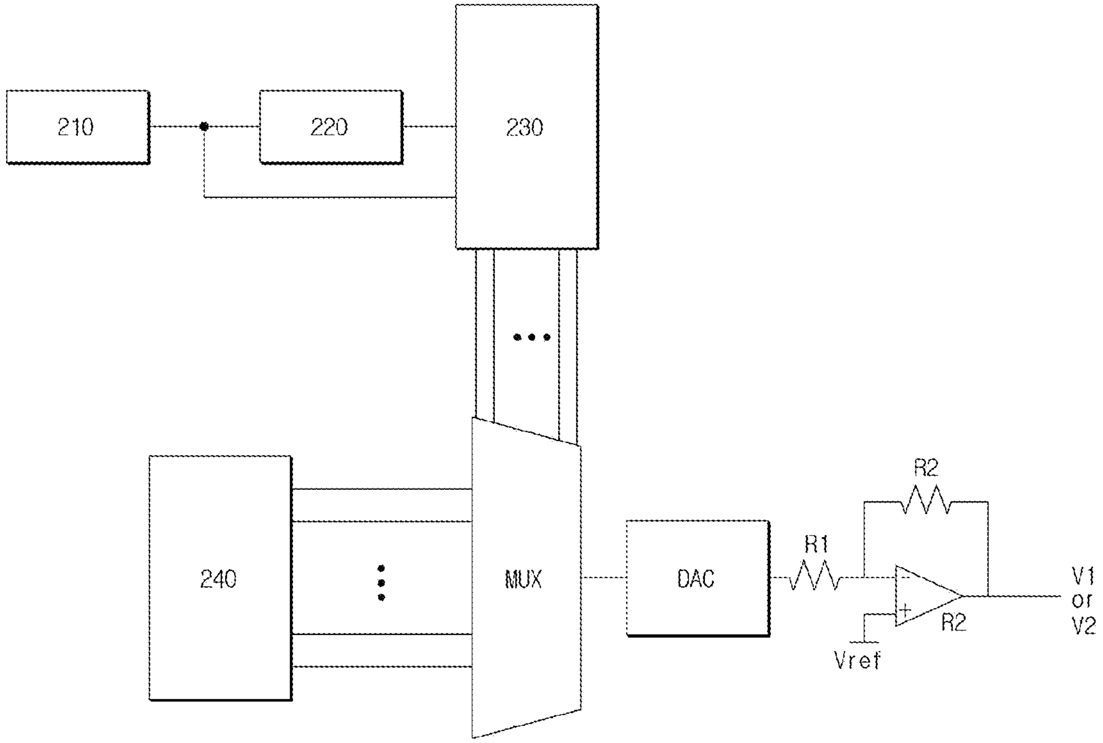
FIG. 6A is a block diagram of a circuit for generating the first bias voltage or the second bias voltage.
Figure 6B:
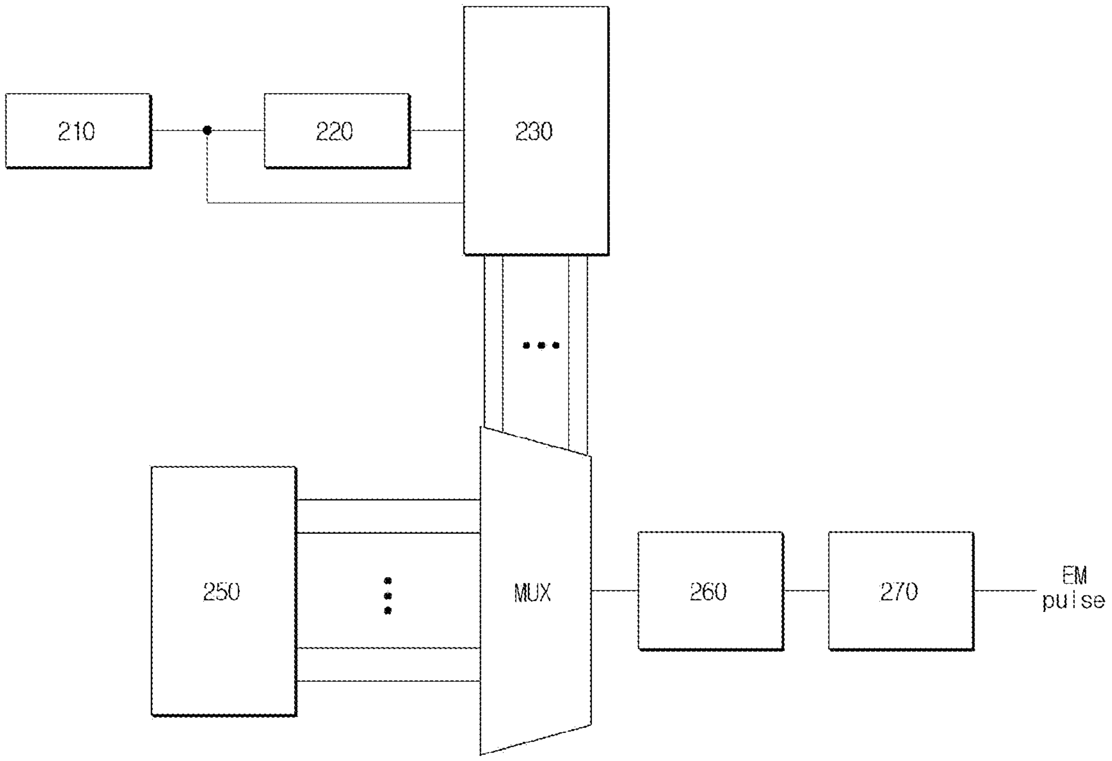
FIG. 6B is a block diagram of a circuit for generating the light emission signal.
Figure 6C:
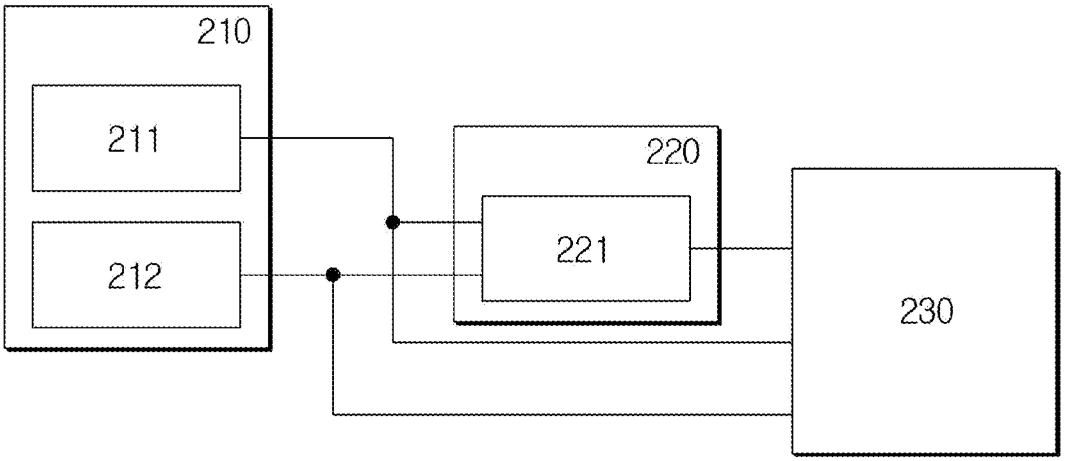
FIGS. 6C and 6D show in detail a circuit block that counts frames and transmits a selection signal to the MUX according to the refresh rate.
Figure 6D:
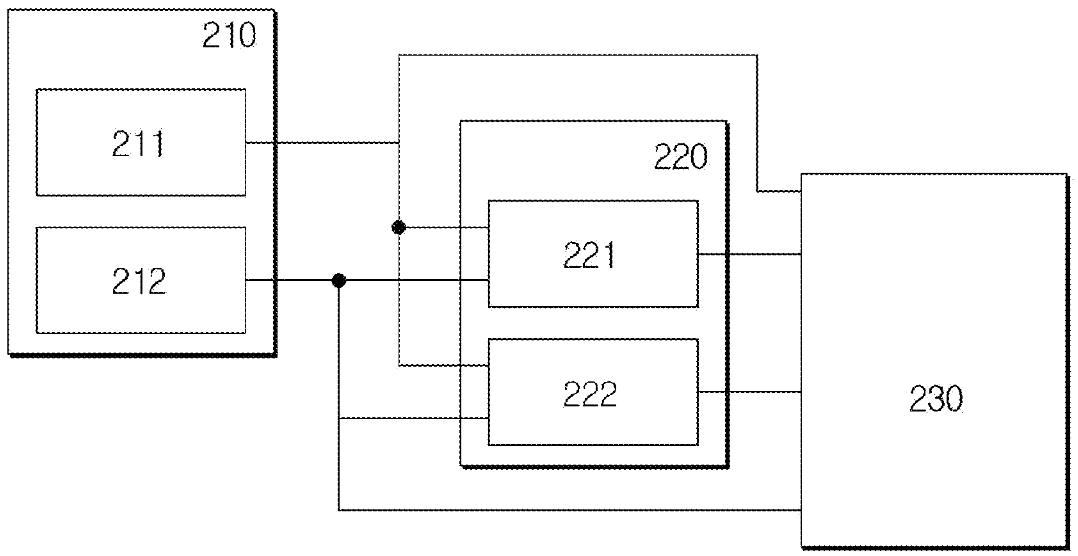

FIG. 6A is a block diagram of a circuit for generating the first bias voltage or the second bias voltage, and FIG. 6B is a block diagram of a circuit for generating the light emission signal. FIGS. 6C and 6D show in detail a circuit block that counts frames and transmits a selection signal to the MUX according to the refresh rate.

Referring to FIGS. 6A to 6D, a flag unit 210 may include a first flag 211 and a second flag 212 which output a flag value for the refresh rate for each section.

The first flag 211 and the second flag 212 output a logic high voltage or a logic low voltage according to the refresh rate applied to the driving of the pixel. For example, when the first flag 211 outputs a first flag value for 60 Hz frequency drive and the second flag 212 outputs a second flag value for 1 Hz frequency drive, the refresh rate which is being applied to the driving is 60 Hz, the first flag 211 may output the logic high voltage, and the second flag 212 may output the logic low voltage. Conversely, when the refresh rate which is being applied to the driving is 1 Hz, the first flag 211 may output the logic low voltage and the second flag 212 may output the logic high voltage.

A counter 220 counts by distinguishing between the refresh frame and the hold frame for each refresh rate on the basis of the flag value output from the flag unit 210, thereby distinguishing between the driving timing for each frame and outputting the accumulated count values.

Referring to FIGS. 6C and 6D, the counter 220 may be comprised of only a first counter 221, or may include the first counter 221 and a second counter 222.

The first counter 221 may count the refresh frame or the hold frame and output a first count value accumulated for each refresh rate. For example, when the refresh rate is 60 Hz, the refresh frame and the hold frame are driven once each for one cycle, so the first count value is counted as "1" in the refresh frame and is counted as "2" in the hold frame. Also, the first count value is initialized again in the next refresh frame and may be counted as "1". Here, each of the first count values counted by the first counter 221 may be represented as one frame (R0, Hn, n is a natural number).

If the refresh rate is 1 Hz, the pixel is driven with one refresh frame and 119 hold frames for one cycle, so that the first count value is initialized in the refresh frame and counted as "1". The count is accumulated in the hold frame and the first count value is counted as "120" in the last $119^{th}$ hold frame and then is initialized, so that the frame can be counted repeatedly.

Here, the first counter 221 may be designed to enable 128-bit operation because it accumulates and counts from "1" to "120". However, the first counter is not limited thereto, and may be changed according to the design.

The second counter 222 may accumulate and count a second count value according to the flag value output from the flag unit 210 and the first count value of the first counter 221. In this case, each of the second count values counted by the second counter 222 may be represented as one SET.

The second counter value may be accumulated and counted whenever the first counter 221 is initialized, and when the flag value is converted, the second count value may be initialized.

Here, the second counter 222 is designed to enable a 2-bit operation, so that it can count and accumulate only from "1" to "4" and maintain the second count value as "4" until initialized again. However, the second counter is not limited thereto and may be changed according to the design. The comparator 230 may receive the flag value for each refresh rate output from the flag unit 210 and the count value output from the counter 220, may operate like an AND gate in accordance with the input flag value and count value, and may output a comparison value to the MUX.

A first register unit 240 includes a plurality of registers, and each of the registers may store an adjusted value of the bias voltage which is applied in the refresh frame and the hold frame for each refresh rate.

The multiplexer MUX may be configured such that a plurality of switches SW1 to SWn one-to-one correspond to the plurality of registers in order to select one of the adjusted values stored in the plurality of registers of the first register unit 240 according to the comparison value output from the comparator 230.

For example, when the counter 220 includes only the first counter 221, the MUX may include first to fourth switches SW1 to SW4.

When the first flag value of the first flag 211 is input as a logic high voltage to the comparator 230 and when the count value of the first counter 221 is input as a logic high voltage, the multiplexer MUX may output a comparison value to turn on the first switch SW1.

When the first flag value of the first flag 211 is input as a logic high voltage to the comparator 230 and when the count value of the first counter 221 is input as a logic low voltage, the multiplexer MUX may output a comparison value to turn on the second switch SW2.

When the second flag value of the second flag 212 is input as a logic high voltage to the comparator 230 and when the count value of the first counter 221 is input as a logic high voltage, the multiplexer MUX may output a comparison value to turn on the third switch SW3.

When the second flag value of the second flag 212 is input as a logic high voltage to the comparator 230 and when the count value of the first counter 221 is input as a logic low voltage, the multiplexer MUX may output a comparison value to turn on the fourth switch SW4.

Also, when the counter 220 includes the first counter 221 and the second counter 222, the multiplexer MUX may include the first to sixth switches SW1 to SW6.

When the first flag value of the first flag 211 is a logic high voltage, the comparison value output from the comparator 230 is the same as the comparison value when the counter 220 includes only the first counter 221.

When the second flag value of the second flag 212 is input as a logic high voltage to the comparator 230, when the count value of the first counter 221 is input as a logic high voltage, and when the count value of the second counter 222 is input as a logic high voltage, the multiplexer MUX may output a comparison value to turn on the third switch SW3.

When the second flag value of the second flag 212 is input as a logic high voltage to the comparator 230, when the count value of the first counter 221 is input as a logic high voltage, and when the count value of the second counter 222 is input as a logic low voltage, the multiplexer MUX may output a comparison value to turn on the fourth switch SW4.

When the second flag value of the second flag 212 is input as a logic high voltage to the comparator 230, when the count value of the first counter 221 is input as a logic low voltage, and when the count value of the second counter 222 is input as a logic high voltage, the multiplexer MUX may output a comparison value to turn on the fifth switch SW5.

When the second flag value of the second flag 212 is input as a logic high voltage to the comparator 230, when the count value of the first counter 221 is input as a logic low voltage, and when the count value of the second counter 222 is input as a logic low voltage, the multiplexer MUX may output a comparison value to turn on the sixth switch SW6.

As such, the multiplexer MUX may select one of the adjusted values stored in the plurality of registers of the first register unit 240 and output it to the digital-to-analog converter DAC. The digital-to-analog converter DAC may convert the input adjusted value into an analog voltage and may output the bias voltages V1 and V2 controlled by a first level or a second level through an amplifier than a reference voltage V_Ref.

Referring to FIG. 6B, the circuit block which generates the light emission signal EM includes the flag unit 210, the counter 220, the comparator 230, and the multiplexer MUX in the same way as the circuit block which generates the bias voltage, and performs the same operation as that of the circuit block which generates the bias voltage, a description thereof will be omitted.

A second register unit 250 includes a plurality of registers, and each of the registers may store a value light emission signal applied in the refresh frame and the hold frame for each refresh rate.

A light emission control signal generator 260 may generate the light emission control signal based on the light emission signal value selected by the multiplexer MUX.

A light emission signal driver 270 may receive the light emission control signal from the light emission control signal generator 260, and may control the width of the pulse of the light emission signal (EM Pulse) supplied in the refresh frame and the hold frame for each refresh rate and output the light emission signal.

Hereinafter, the present invention proposes a method for preventing the occurrence of a difference in luminance by adjusting the first bias voltage V1 or the second bias voltage V2 and the light emission signal EM before and after a point of time when the refresh rate changes.

Figure 7:
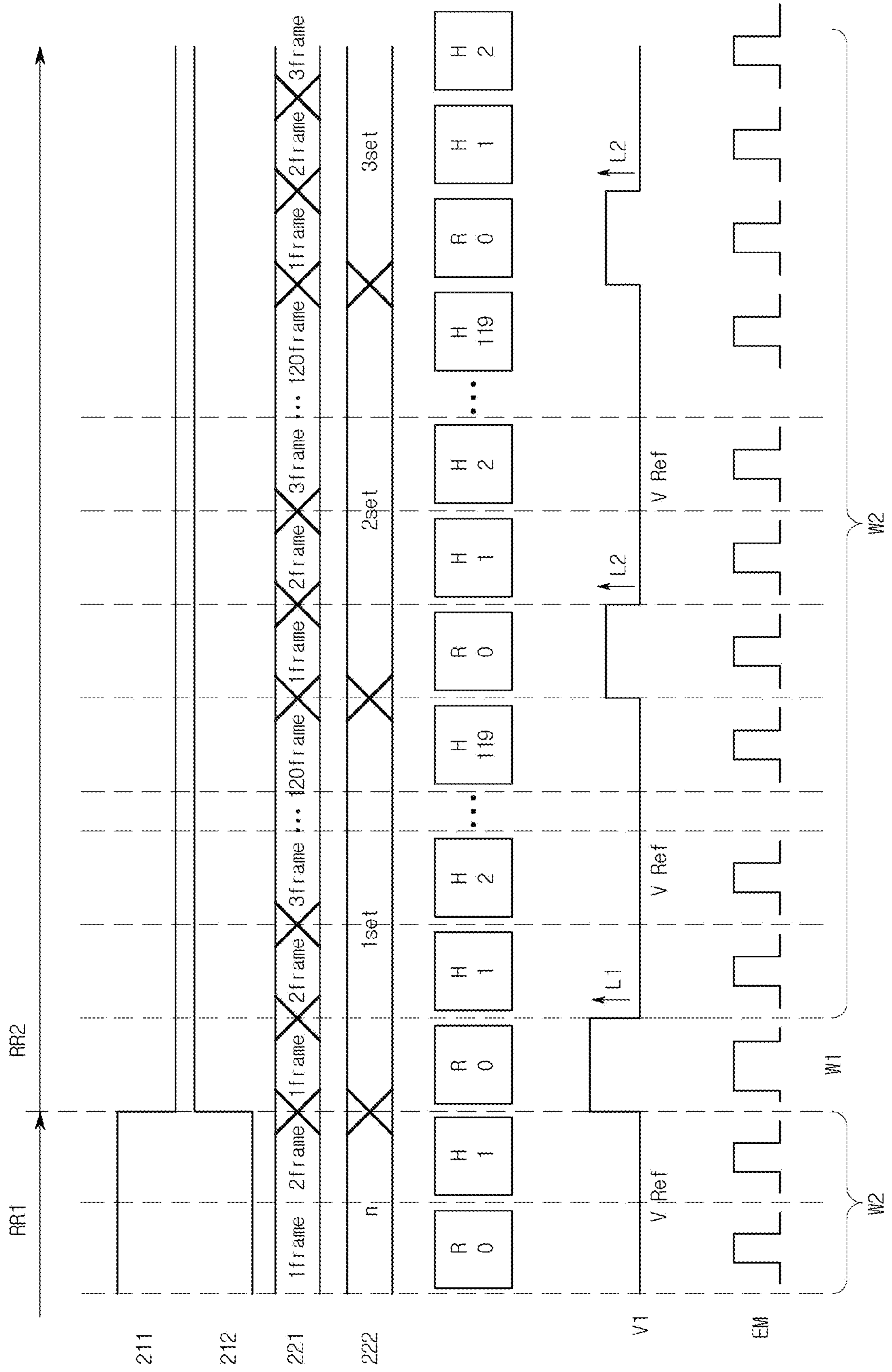
FIG. 7 is a view for describing a first method for luminance deviation compensation drive.

FIG. 7 is a view for describing a first method for luminance deviation compensation drive.

For example, the first refresh rate RR1 may be 60 Hz, and the second refresh rate RR2 may be 1 Hz. In the first refresh rate RR1 section, the first flag value of the first refresh rate RR1 may have a logic high voltage, and the second flag value of the second refresh rate RR2 may have a logic low voltage. Also, in the second refresh rate RR2 section, the first flag value of the first refresh rate RR1 may have a logic low voltage, and the second flag value of the second refresh rate RR2 may have a logic high voltage.

The first bias voltage V1 may be adjusted to a voltage higher than the reference voltage V_Ref by the first level in the first refresh frame period (R0 of 1 SET) after switching to the second refresh rate RR2. For example, the first level may be a value of 5% to 7% of the reference voltage V_Ref, but is not limited thereto, and may be changed according to the design.

When the first refresh frame is counted (R0 of 1 SET) at the second refresh rate RR2, the adjustment of the first bias voltage V1 is to compensate for the luminance variation in this section. When the first bias voltage V1 is increased, the voltage of the channel of the driving transistor DT becomes higher than the voltage of the gate, thereby increasing the driving current Id. As a result, since the luminance of the electroluminescent device ELD is increased and compensated, when the pixel is driven by changing the refresh rate from a high refresh rate to a low refresh rate, it is possible to solve the problem of occurrence of flicker at a point of time when the refresh rate changes.

When the remaining refresh frames (R0 of n+1 SET, n is a natural number) other than the first refresh frame are counted at the second refresh rate RR2, the first bias voltage V1 can be adjusted to a voltage higher than the reference voltage Ref by the second level. For example, the second level may be a value of 2% to 3% of the reference voltage Ref, and may be changed according to the design without being limited thereto. The characteristics of the driving transistor DT changes the most immediately after switching to the second refresh rate RR2, and the reduced amount of the driving current Id is also the largest. Therefore, in the refresh frame period after the first refresh frame period, it is necessary to make the luminance compensation of the electroluminescent device ELD smaller. Therefore, it is preferable that the second level is lower than the first level.

When the first refresh frame (R0 frame of 1 SET) is counted at the second refresh rate RR2, a deviation of the bias stresses of the first refresh rate RR1 and the second refresh rate RR2 can be removed by applying the first bias voltage V1 adjusted by the first level than the reference voltage V_Ref. A fine luminance deviation can be additionally compensated by controlling the pulse width of the light emission signal EM.

In other words, when the deviation of the bias stress is removed by adjusting the first bias voltage V1 to be greater than the reference voltage V_Ref by the first level, the luminance at the second refresh rate RR2 may be slightly higher than the luminance at the first refresh rate RR1. Since the pulse width of the light emission signal EM can be finely adjusted in units of several microseconds (μs), the luminance is reduced by applying a larger pulse width of the light emission signal EM in the R0 frame of 1 SET, so that the fine luminance deviation can be additionally compensated. For example, the pulse width w1 of the light emission signal EM in the R0 frame of 1 SET may be in a high state for about 300 μs, and the pulse width w2 of the light emission signal EM during the remaining periods other than this may be in a high state for about 100 μs. However, the pulse width is not limited thereto and may be changed according to the design.

Meanwhile, in the first embodiment, the counter 220 can use both the first counter 221 and the second counter 222. Each SET section is specified through the second counter 222, and the R0 frame is specified through the first counter 221, so that the first bias voltage V1 and the pulse width of the light emission signal EM can be adjusted for each R0 frame of each SET.

Figure 8:
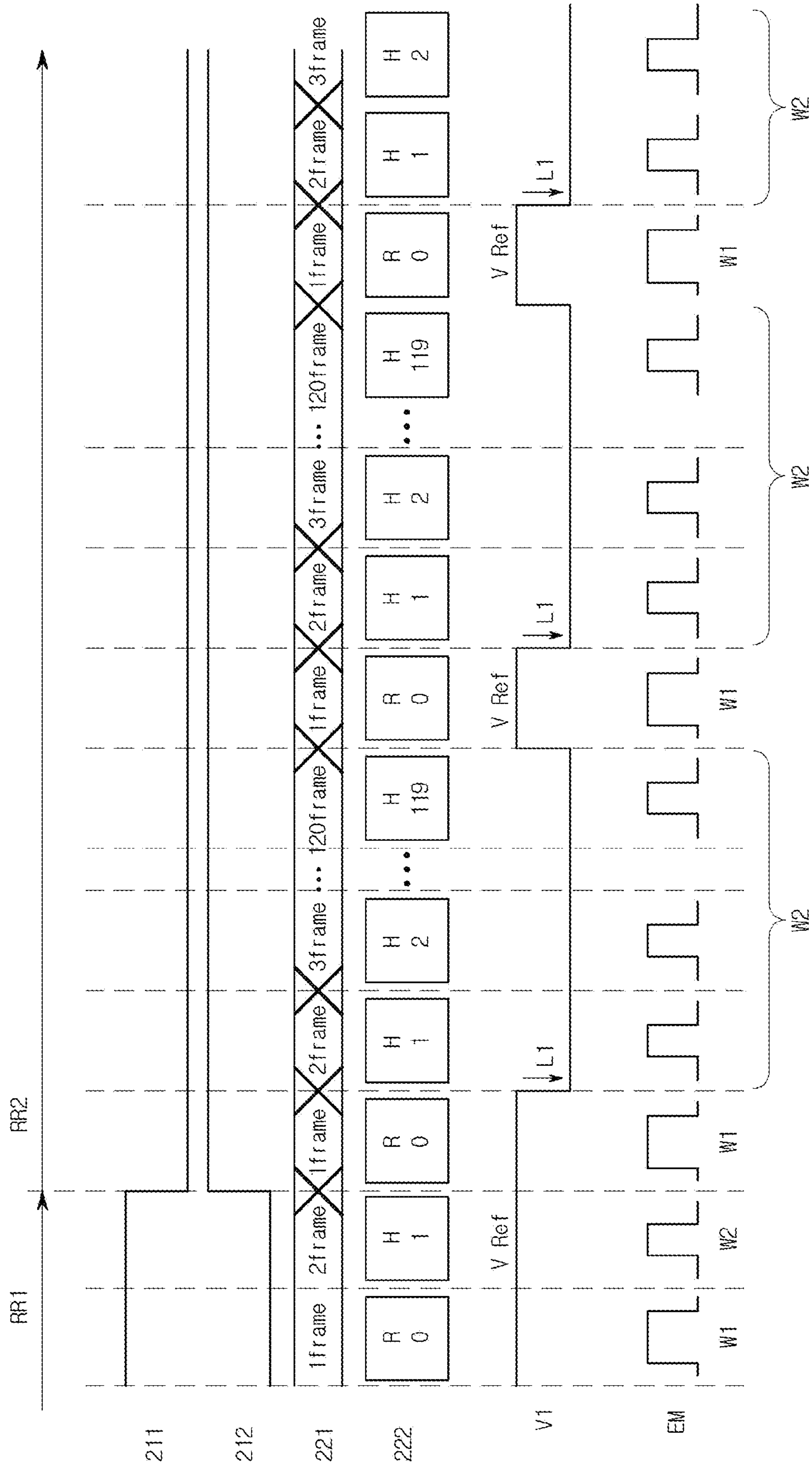
FIG. 8 is a view for describing a second method for luminance deviation compensation drive.

FIG. 8 is a view for describing a second method for luminance deviation compensation drive.

It has been described above that the difference in the characteristics of the driving transistor DT occurs between the driving at the first refresh rate RR1 and the driving at the second refresh rate RR2. The difference in the characteristics of the driving transistor DT results from a difference in the amount of bias stress within one set. A second embodiment provides a method for removing a deviation of the amount of bias stress, which is a reason for the difference in characteristics of the driving transistor DT.

In order to reduce the amount of bias stress at the second refresh rate RR2, it is necessary to reduce the first bias voltage V1 in the hold frame period in preparation for the refresh frame period. Specifically, the deviation of the amount of the bias stress can be removed by adjusting the first bias voltage V1 to be as low as the first level in the entire hold frame period at the second refresh rate RR2. For example, the first level may be a value of 5% to 7% of the reference voltage V_Ref and may be changed according to the design without being limited thereto.

Accordingly, since the driving current Id is equal to the channel activity of the driving transistor DT at the first refresh rate RR1 and the second refresh rate RR2, the luminance deviation can be improved.

Meanwhile, the luminance deviation may occur between the refresh frame and the hold frame because the first bias voltage V1 is reduced in the hold frame period. Therefore, in order to remove the luminance deviation between the refresh frame and the hold frame, when the refresh frame R0 is counted at the first refresh rate RR1 and at the second refresh rate RR2, the fine luminance deviation can be additionally compensated by adjusting the pulse width w1 of the light emission signal EM.

In other words, since the pulse width of the light emission signal EM can be finely adjusted in units of several microseconds (μs), an approximate value can be adjusted to be more accurate on a target luminance Therefore, when the R0 frame is counted at the first refresh rate RR1 and the second refresh rate RR2, the luminance is reduced by applying a larger pulse width w1 of the light emission signal EM, so that the fine luminance deviation can be additionally compensated. For example, the pulse width w1 of the light emission signal EM may be in a high state for about 300 μs in all the R0 frames, and the pulse width w2 of the light emission signal EM during the remaining periods other than this may be in a high state for about 100 μs. However, the pulse with is not limited thereto and may be changed according to the design. Meanwhile, in the second embodiment, only the first counter 221 may be used in the counter 220. Unlike the first embodiment in which the pulse width of the light emission signal EM and the first bias voltage V1 of the R0 frame are adjusted for each SET, in the second embodiment, since the pulse widths of the light emission signal EM and the first bias voltage V1 are adjusted when the refresh frame R0 is counted in the entire section in which the hold frame is counted at the second refresh rate RR2 or is counted at the first refresh rate RR1 and the second refresh rate RR2, there is no need to distinguish the SET. Accordingly, the counter 220 of the second embodiment can include only the first counter 221.

Figure 9:
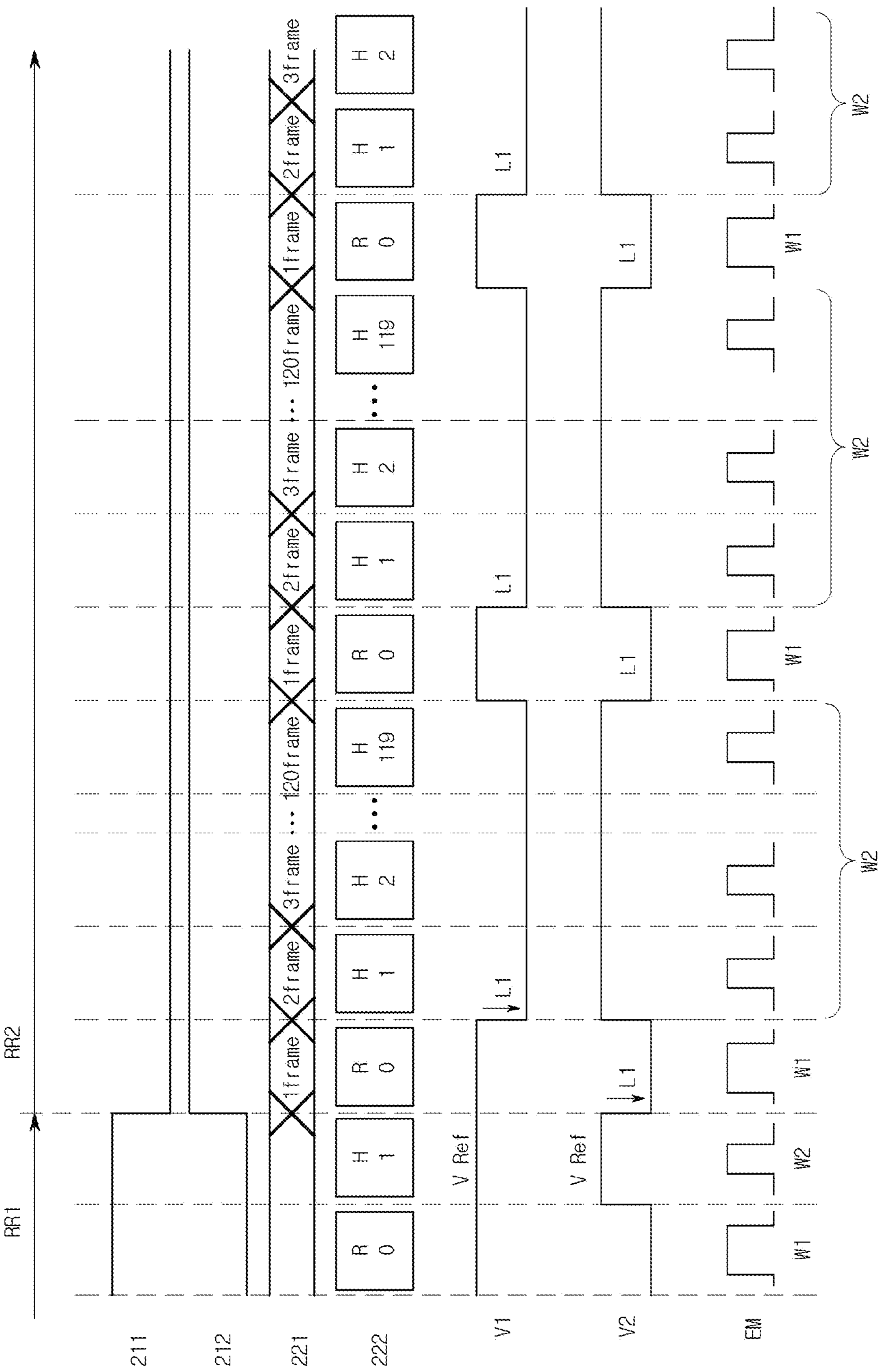
FIG. 9 is a view for describing a third method for luminance deviation compensation drive.

FIG. 9 is a view for describing a third method for luminance deviation compensation drive.

Unlike the first and second embodiments, in the third embodiment, the second bias voltage V2 may be additionally adjusted. The second bias voltage V2 is a voltage for initializing the pixel electrode of the electroluminescent device ELD. When the initialization voltage before the first bias voltage V1 is lowered, the final luminance of the light emitting device ELD is lowered, thereby preventing a luminance deviation between the refresh frame and the hold frame. The second bias voltage V2 initializes the pixel electrode of the electroluminescent device ELD. Since the final luminance of the electroluminescent device ELD is reduced by reducing the initialization voltage before the first bias voltage V1, luminance deviation between the refresh frame and the hold frame can be prevented.

First, in order to reduce the amount of bias stress at the second refresh rate RR2, the first bias voltage V1 is reduced in the hold frame period. Specifically, the first bias voltage V1 is adjusted to be as high as the first level when the refresh frame R0 is counted at the second refresh rate RR2.

Also, in order to remove the luminance deviation between the refresh frame and the hold frame, it is necessary to correct the luminance by increasing the second bias voltage V2 in the hold frame period. Specifically, the second bias voltage V2 is adjusted to a voltage as high as the first level in the entire section in which the hold frame is counted at the second refresh rate RR2. Also, the second bias voltage V2 is adjusted to be as high as the first level when the hold frame H1 of the first refresh rate RR1 is counted. For example, the first level may be 5% to 7% of the reference voltage V_Ref and is not limited thereto.

Finally, the fine luminance deviation that is not eliminated by adjusting the voltage levels of the first bias voltage V1 and the second bias voltage V2 can be compensated by adjusting the pulse width of the light emission signal EM.

That is to say, since the pulse width of the light emission signal EM can be finely adjusted in units of several microseconds (μs), an approximate value can be adjusted to be more accurate on a target luminance Therefore, when the refresh frame R0 is counted at the first refresh rate RR1 and the second refresh rate RR2, the luminance is reduced by applying a larger pulse width w1 of the light emission signal EM, so that the fine luminance deviation can be additionally compensated. For example, the pulse width w1 of the light emission signal EM may be in a high state for about 300 μs in the refresh frame R0, and the pulse width w2 of the light emission signal EM during the remaining periods other than this may be in a high state for about 100 μs. However, the pulse with is not limited thereto and may be changed according to the design.

Meanwhile, also in the third embodiment as with the second embodiment, the counter 220 may include only the first counter 221. In the third embodiment, the refresh frame and the hold frame are distinguished and the pulse width of the light emission signal EM, the first bias voltage V1, and the second bias voltage V2 are adjusted in the hold frame (Hn frame) period or the refresh frame period (R0 frame). Therefore, the counter 220 of the third embodiment may include only the first counter 221.

According to the first to third methods of the luminance deviation compensation drive as described above, the luminance deviation that occurs when the pixel is driven by changing the refresh rate from a high refresh rate (for example, 60 Hz) to a low refresh rate (for example, 1 Hz) can be eliminated.

As described above, the present disclosure relates to an electroluminescent display device using a variable refresh rate (VRR) mode. According to the first to fourth methods of the luminance deviation compensation driving, it is possible to eliminate the deviation of the amount of bias stress of the driving transistor DT that occurs when the pixel is driven by changing the refresh rate from a high refresh rate (for example, 60 Hz) to a low refresh rate (for example, 1 Hz). As a result, the occurrence of the difference in luminance at a time point of a refresh rate change is reduced, and viewers are not able to perceive that the refresh rate is changed.

The above description and accompanying drawings are merely illustrative of the spirit of the present invention. Various modifications and variations such as combination, separation, substitution, changes, etc., can be made within a range without departing from the essential characteristics of the present invention by those skilled in the art to which the present invention belongs. Accordingly, the embodiments disclosed in the present disclosure are for describing rather than for limiting the spirit of the present invention, and the scope of the spirit of the present invention is not limited by these embodiments. The protection scope of the present invention should be construed by the following claims, and all the technical spirit within the scope equivalent thereto should be construed as being included in the scope of the present invention.

What is claimed is:

1. A display device comprising:

a display panel including a plurality of pixels and being operated by frames, the frames including at least one refresh frame, a period of the at least one refresh frame varies based on a refresh rate;

a scan driver configured to supply a scan signal, the scan driver arranged at one side or both sides of the display panel; and a light emission signal driver configured to supply a light emission signal, the light emission signal driver arranged at another side of the display panel;

wherein the light emission signal driver is configured to change a duty ratio of the light emission signal at a time point of a change of the refresh rate, wherein the refresh rate is decreased at the time point, a first bias voltage is increased and the duty ratio of the light emission signal is increased, and wherein the refresh rate comprises a first refresh rate and a second refresh rate, and the second refresh rate includes at least one refresh frame and at least two hold frames that follow the at least one refresh frame.

2. The display device according to claim 1, wherein each of the plurality of pixels comprises:

an electroluminescent device;

a driving transistor configured to drive the electroluminescent device; and a pixel circuit including at least one switching transistor.

3. The display device according to claim 2, wherein the at least one switching transistor is diode-connected to the driving transistor, and the pixel circuit includes at least one NMOS transistor.

4. The display device according to claim 1, wherein each of the plurality of pixels comprises a first light emission control transistor and a second light emission control transistor connected between a first power supply voltage and an electroluminescent device.

5. The display device according to claim 1, wherein each of the plurality of pixels comprises a first bias transistor connected to a first bias voltage.

6. The display device according to claim 1, wherein each of the plurality of pixels comprises a second bias transistor connected to a second bias voltage.

7. The display device according to claim 1, wherein each of the plurality of pixels comprises a pixel circuit including at least one switching transistor, a storage capacitor connected to the at least one switching transistor, and a driving transistor configured to control a driving current flowing through an electroluminescent device in accordance with a voltage charged in the storage capacitor.

8. The display device according to claim 7, wherein an amount of the voltage charged in the storage capacitor varies in the at least one refresh frame.

9. The display device according to claim 8, wherein the at least one switching transistor is turned on by the scan signal or the light emission signal, and the amount of the voltage charged in the storage capacitor is determined based on a duty ratio of the light emission signal.

10. The display device according to claim 1, wherein the scan signal comprises a first scan signal to transmit a data signal to a first node for sampling a threshold voltage of a driving transistor.

11. The display device according to claim 1, wherein the scan signal comprises a second scan signal to transmit a first bias voltage and a second bias voltage in common.

12. The display device according to claim 1, wherein the scan signal comprises a third scan signal to transmit a data signal to a second node.

13. The display device according to claim 1, further comprising:

a first register unit including a plurality of first registers, each of the plurality of first registers storing an adjusted value of a bias voltage, the adjusted value stored in a register from the plurality of first registers is different from the adjusted value stored in other registers from the plurality of first registers, a second register unit including a plurality of second registers, each of the plurality of second registers storing a value of the light emission signal, the value of the light emission signal stored in a register is different from the value of the light emission signal stored in other registers from the plurality of second registers.

14. The display device according to claim 13, further comprising:

a counter configured to receive a flag value that distinguishes refresh rates and generate a count value by distinguishing between the at least one refresh frame and the at least two hold frames.

15. The display device according to claim 14, wherein the flag value comprises a first flag value corresponding to the first refresh rate and a second flag value corresponding to the second refresh rate, the second refresh rate less than the first refresh rate.

16. The display device according to claim 15, wherein the counter comprises:

a first counter configured to generate a first count value according to the at least one refresh frame and the at least two hold frames and initialize the first count value according to a cycle of the first refresh rate or the second refresh rate; and a second counter configured to generate a second count value every time the first count value is initialized, and initialize the second count value responsive to the first flag value or the second flag value being switched.

17. The display device according to claim 16, wherein the first counter is configured to generate the first count value by accumulating and counting from 1 to 120, and initialize the first count value after counting 120.

18. The display device according to claim 16, wherein the second counter is configured to generate the second count value by accumulating and counting from 1 to 4, and maintain the second count value as 4 until initializing.

19. The display device according to claim 14, further comprising:

a comparator configured to output a comparison value that varies a voltage level of the bias voltage and a pulse width of the light emission signal in accordance with the flag value and the count value.

20. The display device according to claim 19, further comprising:

a multiplexer configured to select and output one adjusted value of the bias voltage from the first register unit or select and outputs one value of the light emission signal from the second register unit.

21. The display device according to claim 20, wherein the multiplexer comprises a plurality of switches, and each of the plurality of switches corresponds one-to-one to each register of the plurality of first registers or each register of the plurality of second registers.

22. The display device according to claim 21, wherein the plurality of switches are turned-on by the flag value.

* * * * *